(12) United States Patent
Chiaki

(10) Patent No.: US 11,463,620 B2
(45) Date of Patent: Oct. 4, 2022

(54) IMAGE PROCESSING APPARATUS AND IMAGE CAPTURING APPARATUS

(71) Applicant: Panasonic Intellectual Property Management Co., Ltd., Osaka (JP)

(72) Inventor: Hisako Chiaki, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 275 days.

(21) Appl. No.: 16/158,538

(22) Filed: Oct. 12, 2018

(65) Prior Publication Data
US 2019/0045122 A1 Feb. 7, 2019

Related U.S. Application Data

(63) Continuation of application No. PCT/JP2017/015377, filed on Apr. 4, 2017.

(30) Foreign Application Priority Data

Apr. 15, 2016 (JP) .............................. JP2016-082305

(51) Int. Cl.
*G06K 9/40* (2006.01)
*H04N 5/232* (2006.01)
(Continued)

(52) U.S. Cl.
CPC ........... *H04N 5/23238* (2013.01); *G06T 1/20* (2013.01); *G06T 3/0018* (2013.01);
(Continued)

(58) Field of Classification Search
None
See application file for complete search history.

(56) References Cited

U.S. PATENT DOCUMENTS

| 6,201,574 B1* | 3/2001 | Martin ................... H04N 7/183 348/E7.087 |
| 7,268,803 B1 | 9/2007 | Murata et al. |

(Continued)

FOREIGN PATENT DOCUMENTS

| JP | 2001-134751 | 5/2001 |
| JP | 2003-125286 | 4/2003 |

(Continued)

OTHER PUBLICATIONS

International Preliminary Report on Patentability and Written Opinion of the International Searching Authority dated Oct. 16, 2018 in International (PCT) Application No. PCT/JP2017/015377.

(Continued)

*Primary Examiner* — Sean M Conner
(74) *Attorney, Agent, or Firm* — Wenderoth, Lind & Ponack, L.L.P.

(57) ABSTRACT

An image processing apparatus includes an image corrector and an output circuit. The image corrector inputs image data. The image corrector processes the image data input by the image corrector. The image corrector arranges an input image indicated by the image data input by the image corrector on a first plane. The image corrector maps each pixel included in a part or whole of a region of the input image arranged on the first plane onto a curved surface. The image corrector maps each point mapped on the curved surface onto a second plane so as to generate new image data. The output circuit outputs the image data processed by the image corrector.

11 Claims, 41 Drawing Sheets

(51) Int. Cl.
*G06T 3/00* (2006.01)
*G06T 1/20* (2006.01)
*G06T 3/40* (2006.01)
*G06T 5/00* (2006.01)
G06T 5/50 (2006.01)
H04N 5/225 (2006.01)

(52) U.S. Cl.
CPC .......... *G06T 3/0031* (2013.01); *G06T 3/4038* (2013.01); *G06T 5/006* (2013.01); *H04N 5/232* (2013.01); *H04N 5/23229* (2013.01); G06T 5/50 (2013.01); H04N 5/2254 (2013.01)

(56) References Cited

U.S. PATENT DOCUMENTS

| | | | |
|---|---|---|---|
| 9,277,122 B1 * | 3/2016 | Imura | G06T 7/292 |
| 9,742,994 B2 * | 8/2017 | Agarwala | G06T 3/0018 |
| 2014/0176542 A1 | 6/2014 | Shohara et al. | |
| 2015/0117543 A1 * | 4/2015 | Hong | H04N 19/533 375/240.16 |
| 2015/0130893 A1 * | 5/2015 | Kimura | G06T 3/4038 348/36 |
| 2015/0358612 A1 * | 12/2015 | Sandrew | H04N 13/271 348/47 |
| 2016/0073024 A1 * | 3/2016 | Yamamoto | H04N 5/2628 348/36 |
| 2016/0078590 A1 | 3/2016 | Aoki et al. | |

FOREIGN PATENT DOCUMENTS

| | | |
|---|---|---|
| JP | 2013-120347 | 6/2013 |
| JP | 2014-127001 | 7/2014 |
| WO | 2014/208230 | 12/2014 |

OTHER PUBLICATIONS

International Search Report dated Jun. 27, 2017 in International (PCT) Application No. PCT/JP2017/015377.

* cited by examiner

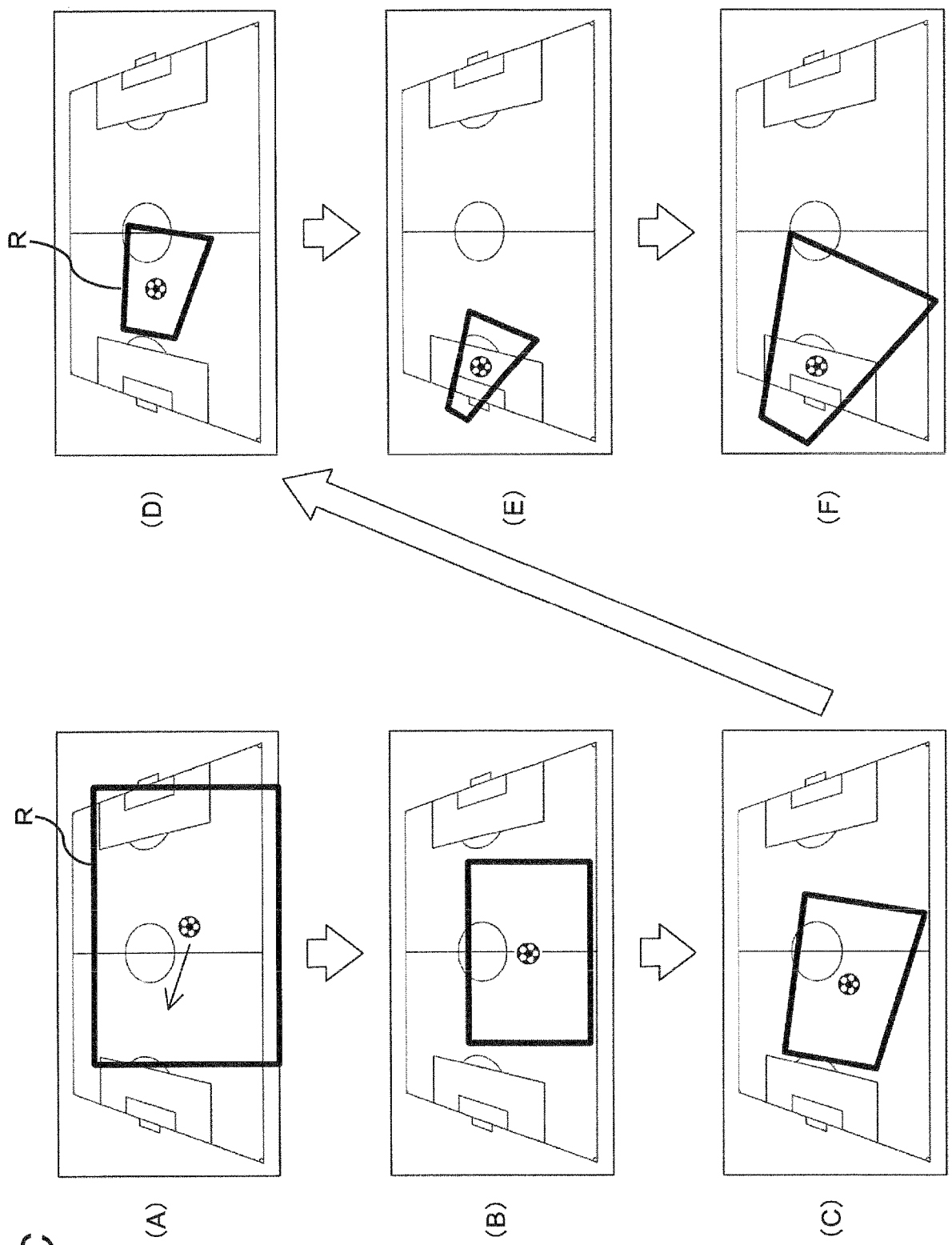

IMAGE PROCESSING APPARATUS AND IMAGE CAPTURING APPARATUS

CROSS-REFERENCE TO RELATED APPLICATIONS

The present application is a continuation application of International Application No. PCT/JP2017/015377, filed Apr. 14, 2017, which claims priority to Japanese Patent Application No. 2016-082305, filed Apr. 15, 2016. The contents of these applications are incorporated herein by reference in their entirety.

BACKGROUND

Technical Field

The present disclosure relates to an image processing apparatus and an image capturing apparatus.

Background Art

Japanese Unexamined Patent Application Publication No. 2013-120347 discloses a method of performing image display on a display device so as to allow a viewer observing a display surface at a position displaced from the front with respect to the display surface to observe an image without distortion. This method includes a step of detecting the position of the viewer with respect to the display unit when the viewer observes the image displayed on the display surface of the image device, a step of, in observing the image displayed on the display surface from the position, generating corrected image data that forms the image into a shape to be observed from a direction perpendicular to the display surface from data of the image, and a step of displaying the corrected image data on the display surface. This makes it possible to display the image in a shape (an original image shape) that does not distort with respect to the near plane perpendicular to the line-of-sight direction of the viewer. Therefore, the viewer can observe images without distortion.

SUMMARY

According to a first aspect of the present disclosure, an image processing apparatus includes an image corrector and an output circuit. The image corrector inputs image data. The image corrector processes the image data input by the image corrector. The image corrector arranges an input image indicated by the image data input by the image corrector on a first plane. The image corrector maps each pixel included in a part or whole of a region of the input image arranged on the first plane onto a curved surface. The image corrector maps each point mapped on the curved surface onto a second plane so as to generate new image data. The output circuit outputs the image data processed by the image corrector.

According to a second aspect of the present disclosure, an image capturing apparatus includes an optical system, an imager, and an image processing apparatus. The optical system includes a lens. The imager captures a subject image input through the optical system so as to generate image data. The image processing apparatus includes an image corrector and an output circuit. The image corrector inputs image data. The image corrector processes an image represented by the image data generated by the imager. The image corrector arranges an input image indicated by the image data input by the image corrector on a first plane. The image corrector maps each pixel included in a part or whole of a region of the input image arranged on the first plane onto a curved surface. The image corrector maps each point mapped on the curved surface onto a second plane so as to generate new image data. The output circuit outputs the image data processed by the image corrector.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings.

FIG. 16C is a view for explaining a change in shape of the clipping region for a performance effect.

DESCRIPTION OF THE EMBODIMENTS

Figure 1:
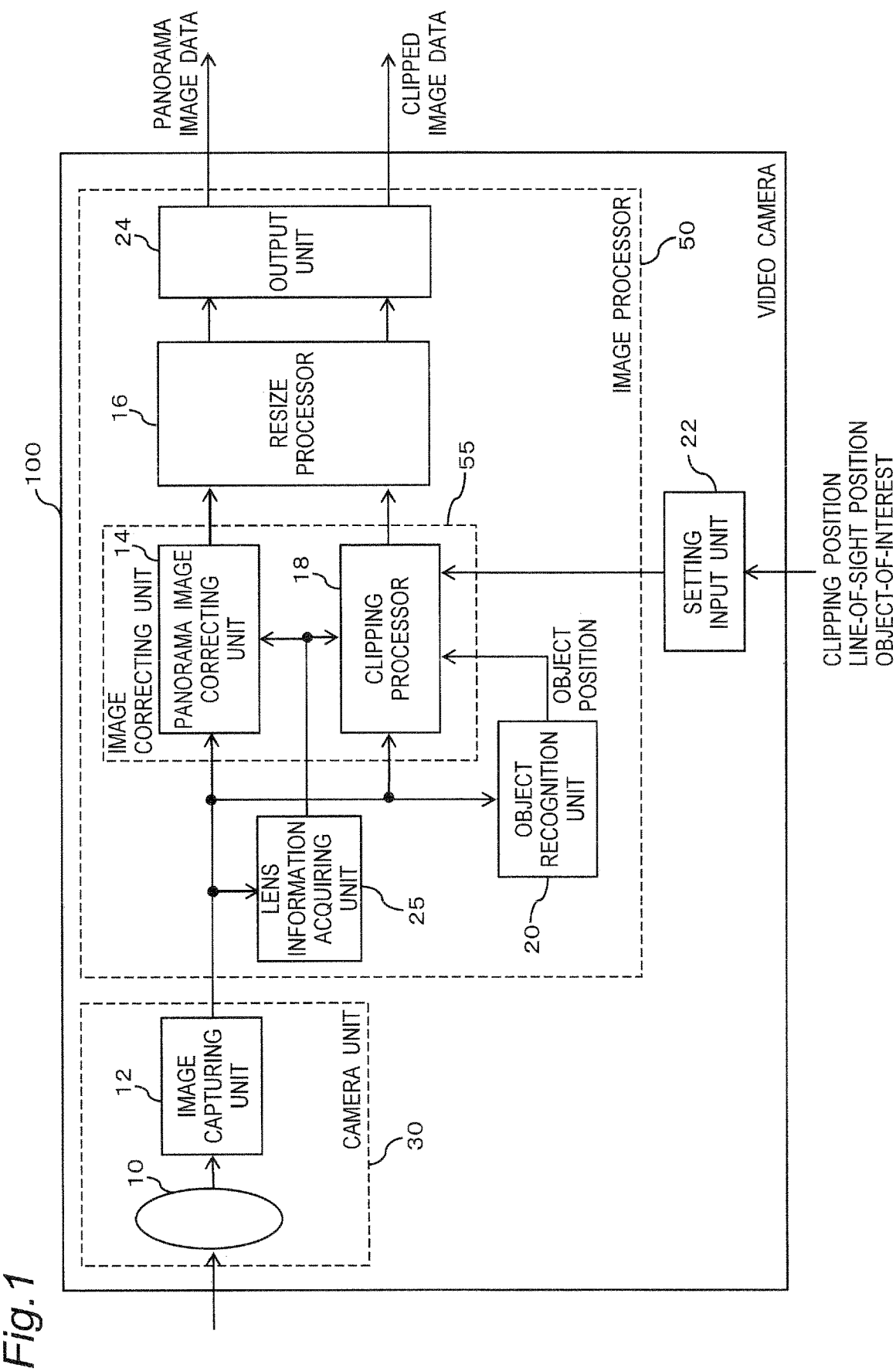
FIG. 1 is a view showing the configuration of a video camera including an embodiment (image processor) of an image processing apparatus according to the present disclosure.

The embodiments will now be described with reference to the accompanying drawings, wherein like reference numerals designate corresponding or identical elements throughout the various drawings.

Embodiments will be described in detail below with reference to the drawings as appropriate. However, unnecessarily detailed description will sometimes be omitted. For example, detailed descriptions of already well-known matters and redundant descriptions of substantially the same configurations will sometimes be omitted. This is to avoid the unnecessary redundancy of the following description and to facilitate understanding by those skilled in the art.

In addition, the inventor (inventors) provides the accompanying drawings and the following description to enable those skilled in the art to sufficiently understand the present disclosure, and does not intend to make them limit the subject matter described in the scope of the claims.

First Embodiment

[1-1. Configuration]

FIG. 1 is a view showing the configuration of a video camera including an image processor as an embodiment of an image processing apparatus according to the present disclosure. A video camera 100 is an image capturing apparatus capable of capturing a moving image or a still image. As shown in FIG. 1, the video camera 100 includes a camera unit 30 that captures a subject and generates image data, and an image processor 50 that processes image data generated by the camera unit 30. Further, the video camera 100 includes a setting input unit 22 that inputs setting information set by the user.

The camera unit 30 includes an optical system 10 and an image capturing unit 12 that generates image data from optical information input via the optical system. The optical system 10 includes a focus lens and a zoom lens. The focus lens and the zoom lens each are constituted by one or a combination of a plurality of lenses. The image capturing unit 12 includes an image sensor that converts optical information into an electric signal (analog signal), an AD converter that converts the analog signal into a digital signal (image signal), and an image processing circuit that generates image data by applying predetermined processing to the image signal. The image sensor is, for example, a CCD or a CMOS image sensor. The image capturing unit 12 of the video camera 100 according to this embodiment generates image data with a high resolution such as 8K or 6K. Metadata that is information indicating imaging conditions (focal length, exposure, shutter speed, field angle, and the like) at the time of image capturing is added to the image data output from the image capturing unit 12.

The image processor 50 includes an image correcting unit 55 that inputs the image data generated by the image capturing unit 12, processes the input image data, and generates image data of a desired field angle, and a resize processor 16 that converts the size of the image data generated by the image correcting unit 55. The image correcting unit 55 includes a panorama image correcting unit 14 that generates a panorama image (including birds-eye view image and wide-angle image) showing the whole subject region from the input image data, and a clipping processor 18 that generates an image (to be referred to as "clipped image" hereinafter) by clipping an image of a partial region (narrow field angle) of the whole subject region. Further, the image processor 50 includes an object recognition unit 20 that recognizes a predetermined object from the captured image, an output unit 24 that outputs the image data generated by the image correcting unit 55, and a lens information acquiring unit 25 that acquires the field angle information of the optical system 10.

The panorama image correcting unit 14 generates an image where the distortion included in the captured image generated by the image capturing unit 12 is corrected. Here, the panorama image correcting unit 14 generates an image having the same or substantially the same field angle as that of the image (to be referred to as the "captured image" hereinafter) indicated by the image data generated by the image capturing unit 12. The resize processor 16 changes the size of the image generated by the panorama image correcting unit 14 and the clipping processor 18. For example, the resize processor 16 changes the size (for example, 8K or 6K) of the image generated by the panorama image correcting unit 14 or the clipping processor 18 to HD (high vision) size (1920×1080 pixels).

The object recognition unit 20 recognizes a predetermined object (for example, a person or an object) from the captured image generated by the image capturing unit 12, detects the position of the object, and outputs position information indicating the detected position. Note that the object recognition unit 20 may recognize a predetermined object based on the output from the panorama image correcting unit 14 or the resize processor 16.

The clipping processor 18 clips an image of a partial region (clipping region) from the whole captured image and generates a clipped image. Based on the position information input from the object recognition unit 20, the clipping processor 18 determines a clipping region (range) for the clipped image. For example, a predetermined range including the position of a predetermined object is set as the clipping region (range). Note that the clipping processor 18 may determine the clipping region (range) based on the designation received via the setting input unit 22.

The lens information acquiring unit 25 acquires field angle information indicating the field angle of the optical system 10 at the time of shooting from the metadata of the captured image. The lens information acquiring unit 25 sends the field angle information to the panorama image correcting unit 14 and the clipping processor 18. An input unit 13 inputs the image data generated by the image capturing unit 12. The input unit 13 includes, for example, a data bus, an interface circuit, and/or an output terminal.

The setting input unit 22 is a circuit for inputting the clipping position, position of interest, and object information designated by a user. The setting input unit 22 includes, for example, a data bus, an interface circuit, and/or an input terminal.

The output unit 24 is a circuit that outputs the image data generated by the panorama image correcting unit 14 and the clipping processor 18. The output unit 24 includes, for example, a data bus, an interface circuit, and/or an output terminal.

The image processor 50 is implemented by, for example, an FPGA. That is, the image processor 50 can be implemented by various hardware circuits (ASIC, DSP, and the like) or a combination of hardware and software (such as a combination of CPU or MPU and programs, and the like). The image processor 50 may include at least either the panorama image correcting unit 14 or the clipping processor 18 and is not limited to the configuration shown in FIG. 1. For example, the image processor 50 may not include the lens information acquiring unit 25 or the object recognition unit 20. That is, an output from the output unit 24 may also include at least either the panorama image data or the clipped image data.

Figure 2:
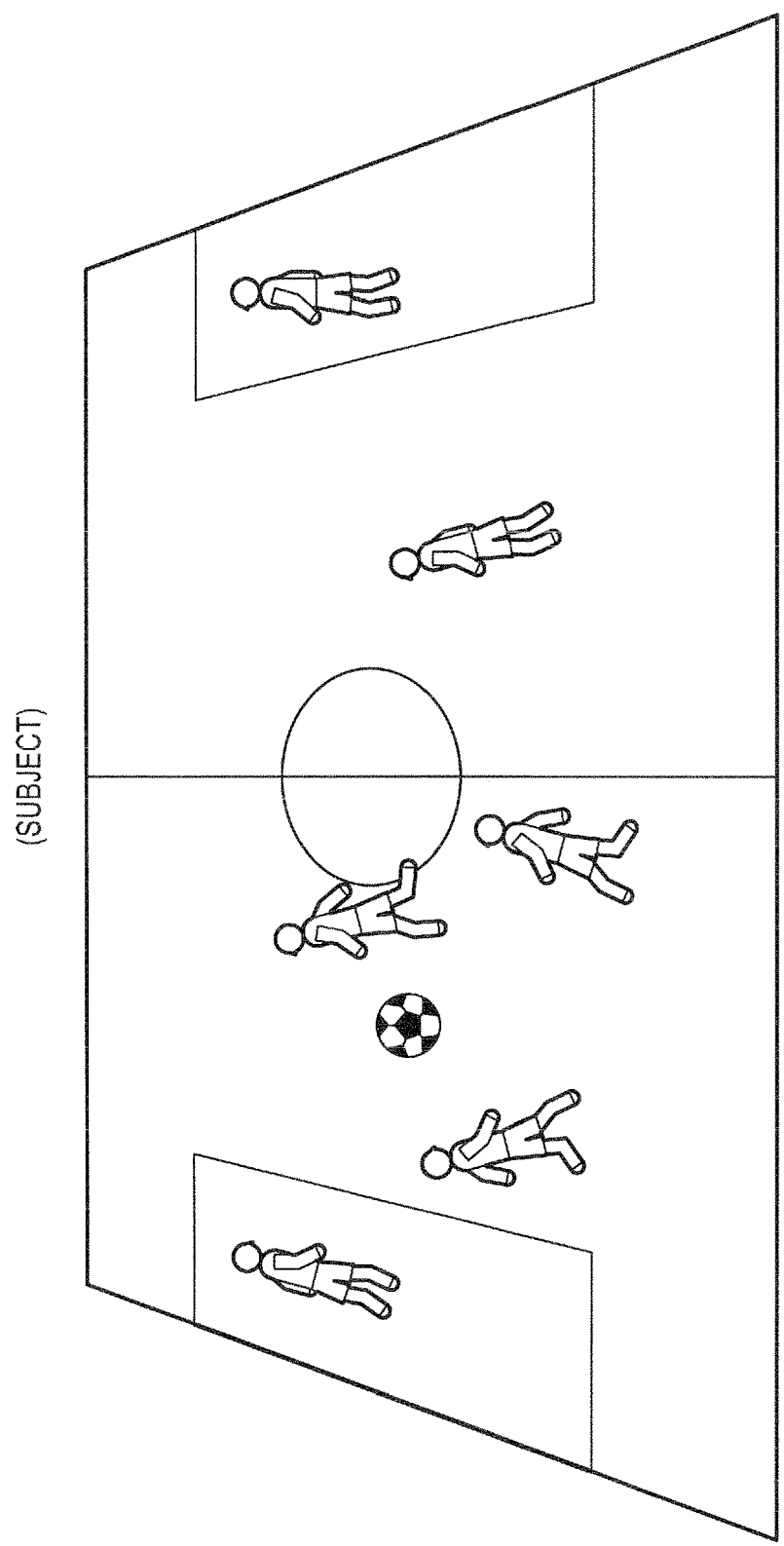
FIG. 2 is a view showing examples of subjects.
Figure 3:
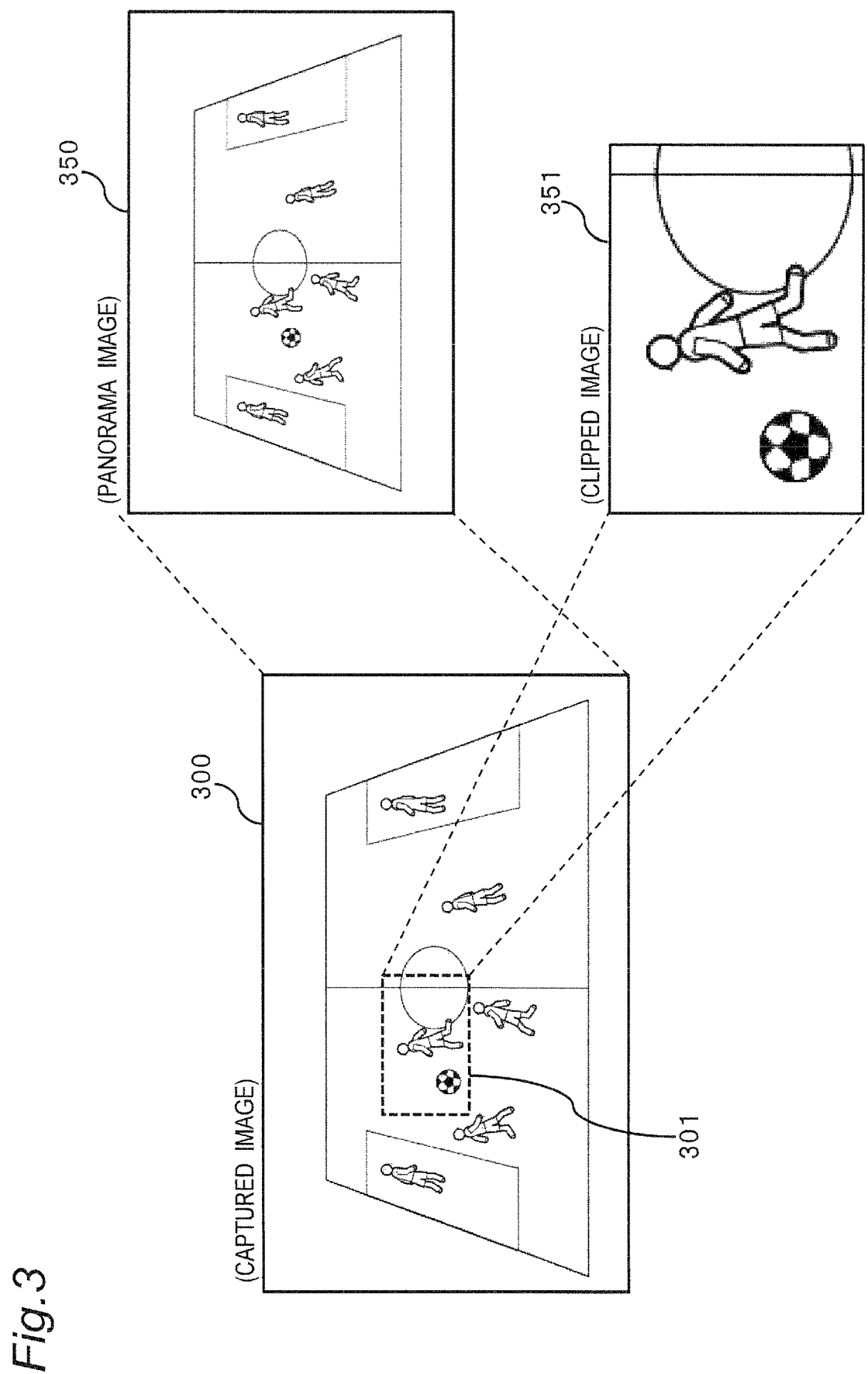
FIG. 3 is a view for explaining two types of images generated by the image processor of the video camera.

The video camera 100 having the configuration described above shoots a subject in the whole field angle region that can be shot and generates a panorama image as an image indicating the whole field angle region and a clipped image acquired by clipping a partial region from the whole field angle region. For example, when a subject as shown in FIG. 2 is shot by the video camera 100, the image capturing unit 12 generates a high-resolution captured image 300 such as an image with 8K or 6K, as shown in FIG. 3. Then, the wide image distortion (described later) in the captured image 300 is corrected by the panorama image correcting unit 14 and the resize processor 16, and a panorama image 350 converted into a desired image size is generated. At the same time, the clipping processor 18 generates a clipped image 351 by clipping a partial region from the captured image 300. The clipped image output from the clipping processor 18 is converted to a desired size by the resize processor 16, and then output.

[1-2. Operation]

The operation of the video camera 100 configured as described above will be described below.

[1-2-1. Wide-Angle Distortion Correction]

Figure 4A:
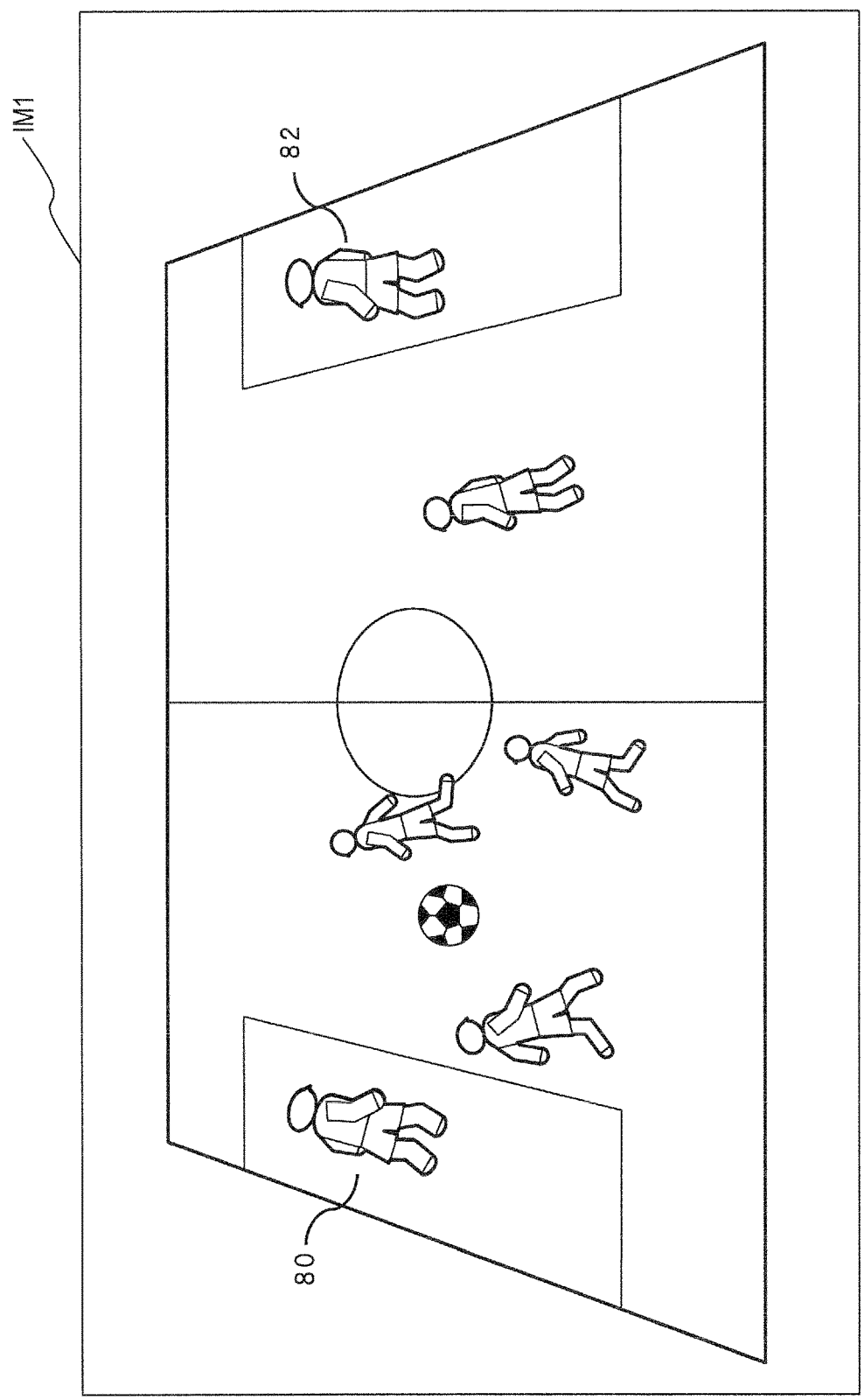
FIG. 4A is a view for explaining wide-angle distortion seen in a wide-angle image.

Wide-angle distortion correction executed in the video camera 100 according to this embodiment will be described first. In general, when a subject is shot with a wide-angle lens, distortion is observed in the subject with an increase in distance from the center of the captured image. In this embodiment, the distortion found in a peripheral portion of such an image is referred to as "wide-angle distortion (or volume distortion)". Wide-angle distortion increases in the degree of distortion in accordance with the distance from the center of the image. FIG. 4A is a view showing a captured image generated when the subject shown in FIG. 2 is shot at a wide angle. As shown in FIG. 4A, in the case of shooting at a wide angle, for example, at ends of an image IM1, the widths of subjects 80 and 82 and their neighboring portions in the horizontal direction and the vertical direction increase in accordance with the distances from the center of the image, thus causing distortion (wide-angle distortion).

Figure 4B:
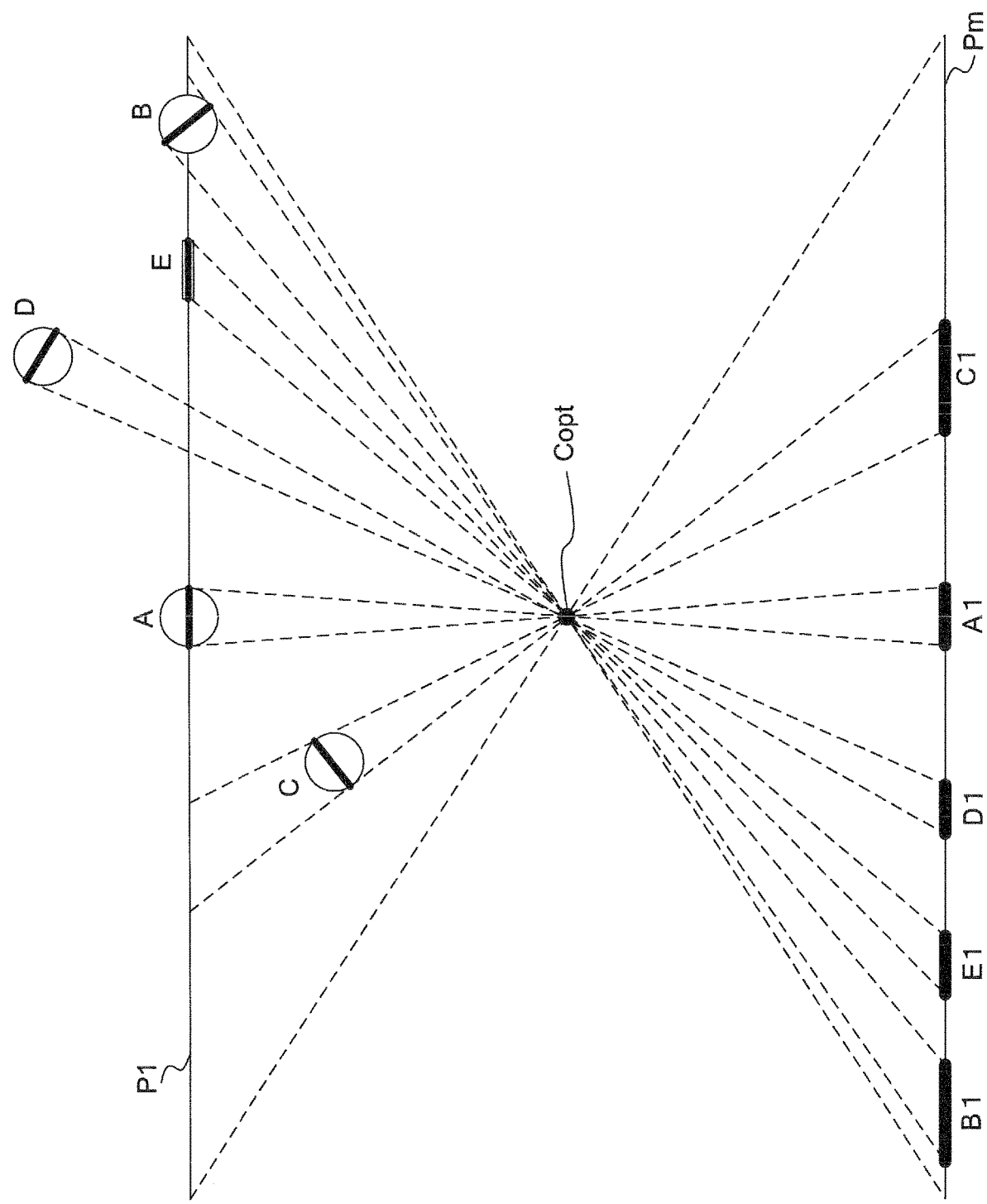
FIG. 4B is a view for explaining wide-angle distortion seen in a wide-angle image.

Wide-angle distortion will be described in more detail with reference to FIG. 4B. Referring to FIG. 4B, spheres A, B, C, D and a plane E are arranged as subjects. The spheres A, B, C and D have the same shape and size. Assume that the length of the plane E is equal to the diameter of each of the spheres A, B, C, and D. A plane parallel to a mapping plane Pm and passing through the sphere A, the plane E, and the sphere B is defined as a plane P1. In this case, the mapping plane Pm corresponds to the image capturing surface of the image sensor in the image capturing unit 12. In other words, the mapping plane Pm corresponds to the captured image generated by the image capturing unit 12. Referring to FIG. 4B, Copt represents the optical center, which corresponds to the optical center of the focus lens of the optical system 10. Images A1 to E1 of the subjects A to E are mapped on the mapping plane Pm.

Now considering the sphere A as a reference, when the focal length is short, in the case of a subject arranged parallel to the mapping plane Pm like the plane E, no distortion occurs in a mapped image E1 on the mapping plane. On the other hand, the distortion of a mapped image B1 of a subject arranged at an end of the field angle like the sphere B is larger than that of the sphere A. This distortion is a wide-angle distortion. When a subject located closer to the optical center Copt than the plane P1, like the sphere C, an image (C1) on the mapping plane Pm is larger than an image (A1) of the sphere A. When a subject located farther from the optical center Copt than the plane P1, like the sphere D, an image (D1) on the mapping plane Pm is smaller than the image (A1) of the sphere A. In addition, because the spheres C and D are separated from the center of the image, slight wide-angle distortions are observed in the images (C1 and D1).

As described above, wide-angle distortions are observed in images formed on the mapping plane Pm in accordance with the positions of subjects (positional displacements from the center of the image). The video camera 100 according to this embodiment has a function of correcting such wide-angle distortion.

Figure 5A:
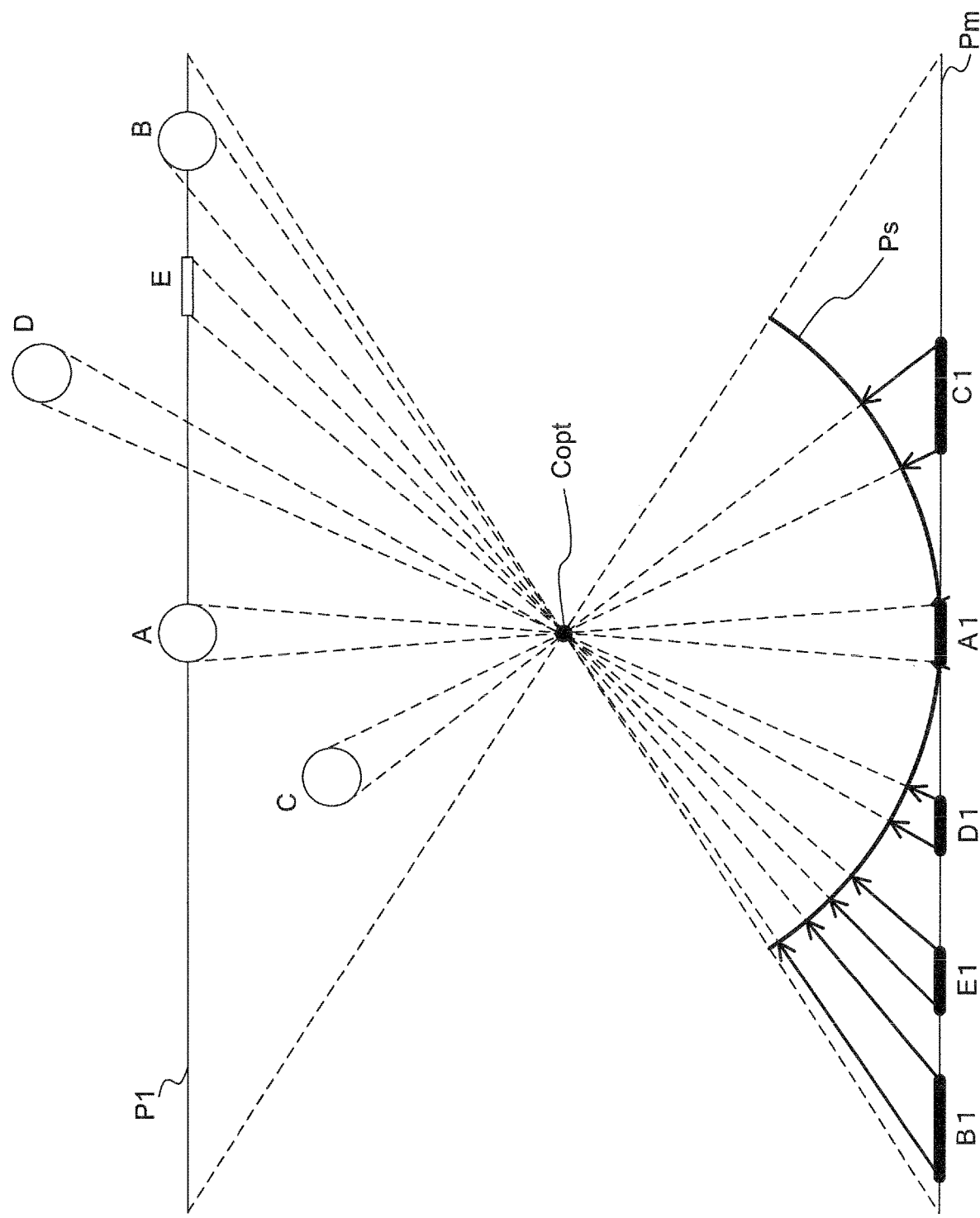
FIG. 5A is a view for explaining the principle for correcting distortion seen in a wide-angle image.
Figure 5B:
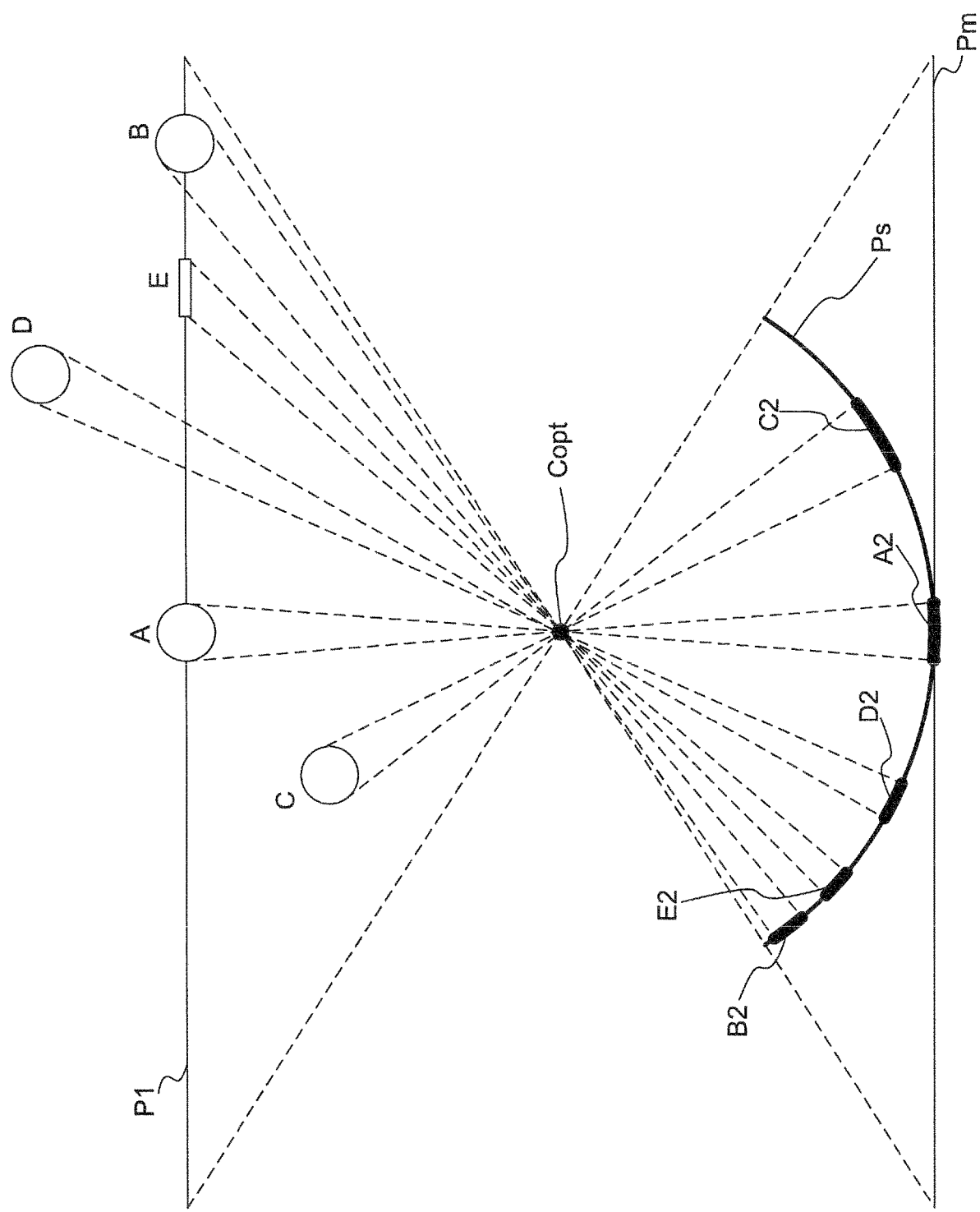
FIG. 5B is a view for explaining the principle for correcting distortion seen in a wide-angle image.

The principle of the wide-angle distortion correction method executed by the video camera 100 according to this embodiment will be described below with reference to FIGS. 5A to 5F. Assume that the subjects A to E are arranged as shown in FIG. 4B. Referring to FIG. 5A, a spherical surface Ps centered on the optical center Copt is set such that the user can observe a naturally looking image (that is, an image without distortion) when viewing, from the optical center Copt, from the left end to the right end of the plane P1 passing through the sphere A on a plane parallel to the mapping plane Pm (corresponding to the image capturable region of the image sensor). Then, captured images are virtually arranged on the mapping plane Pm. At this time, the captured images are arranged such that the normal line of the mapping plane Pm passing through the centers of the captured images passes through the center of the spherical surface Ps. All the points (pixels) of the region corresponding to the captured images on the mapping plane Pm are mapped on the spherical surface Ps. At this time, mapping is performed such that each point on the mapping plane Pm is arranged at the intersection between the straight line connecting each point on the mapping plane Pm and the optical center Copt and the spherical surface Ps. FIG. 5B is a view for explaining a state in which each point on the mapping plane Pm is mapped on the spherical surface Ps in this manner. FIGS. 5A to 5F (the same applies to other drawings) show a horizontal section of the spherical surface Ps, illustrating only one-dimensionally mapped images in the horizontal direction (x direction) for the sake of descriptive convenience. In practice, however, each point on the mapping plane Pm is mapped onto the spherical surface Ps two-dimensionally (in the horizontal direction (x direction) and in the vertical direction (y direction)).

Figure 5C:
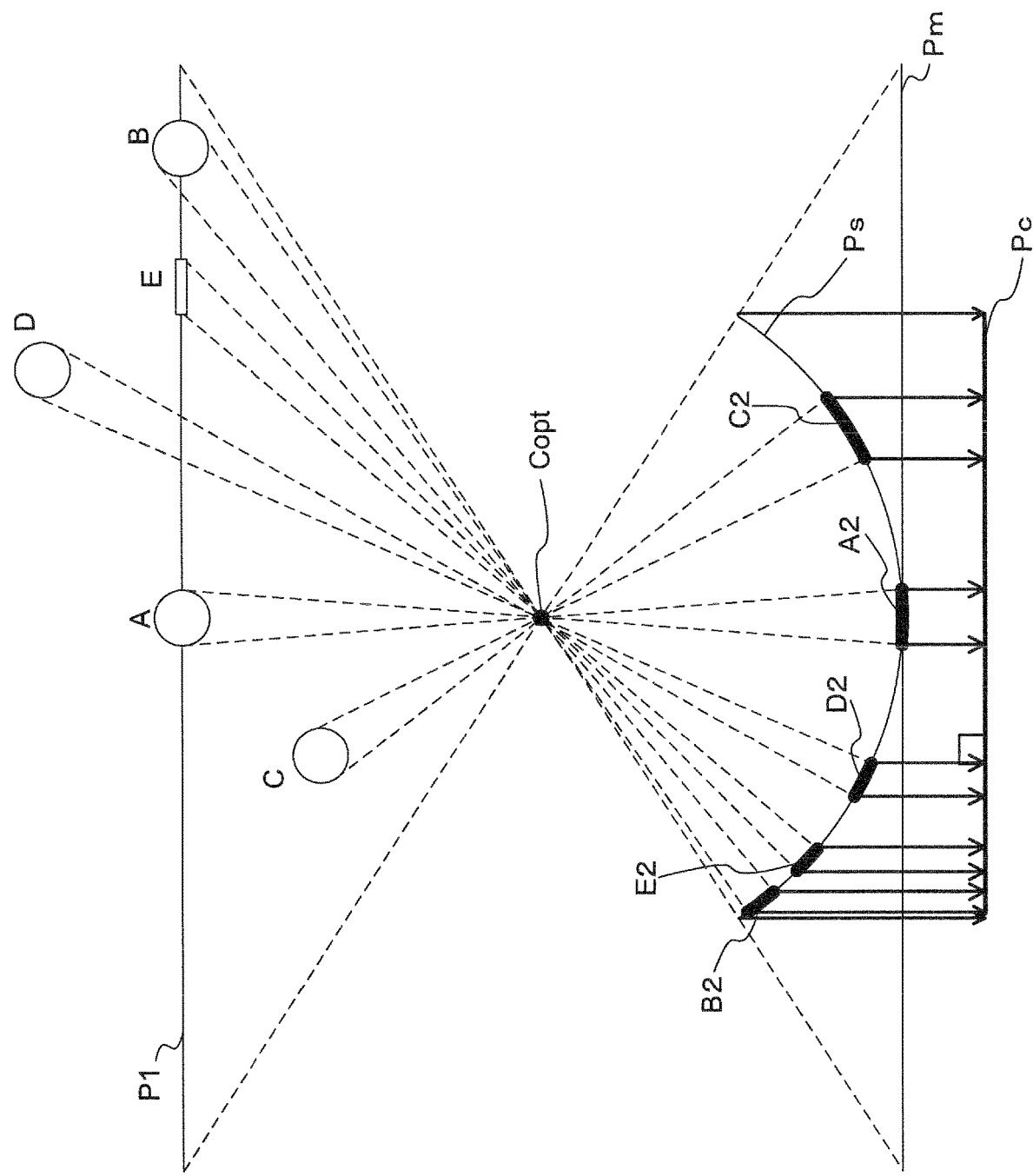
FIG. 5C is a view for explaining the principle for correcting distortion seen in a wide-angle image.
Figure 5D:
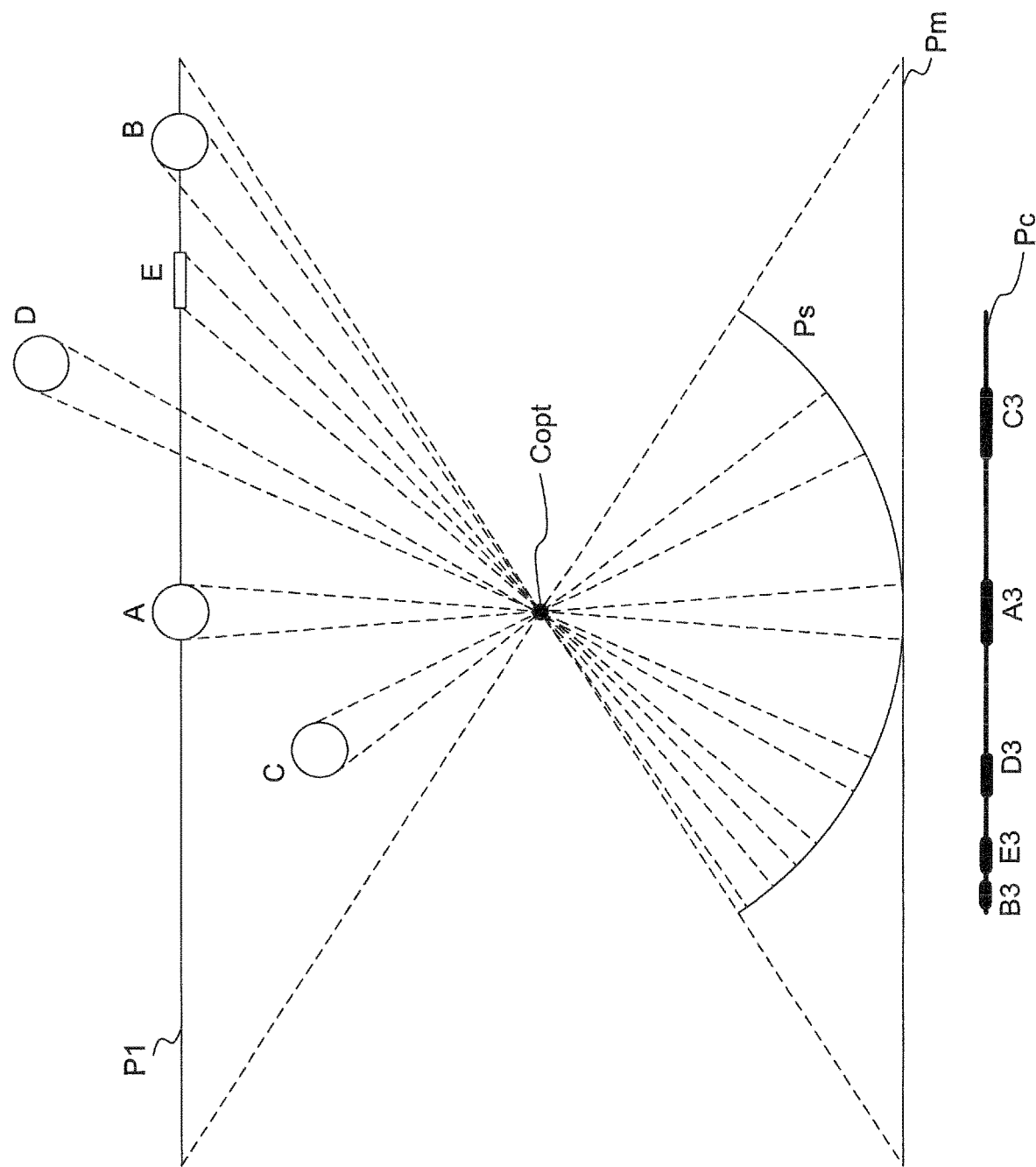
FIG. 5D is a view for explaining the principle for correcting distortion seen in a wide-angle image.
Figure 5E:
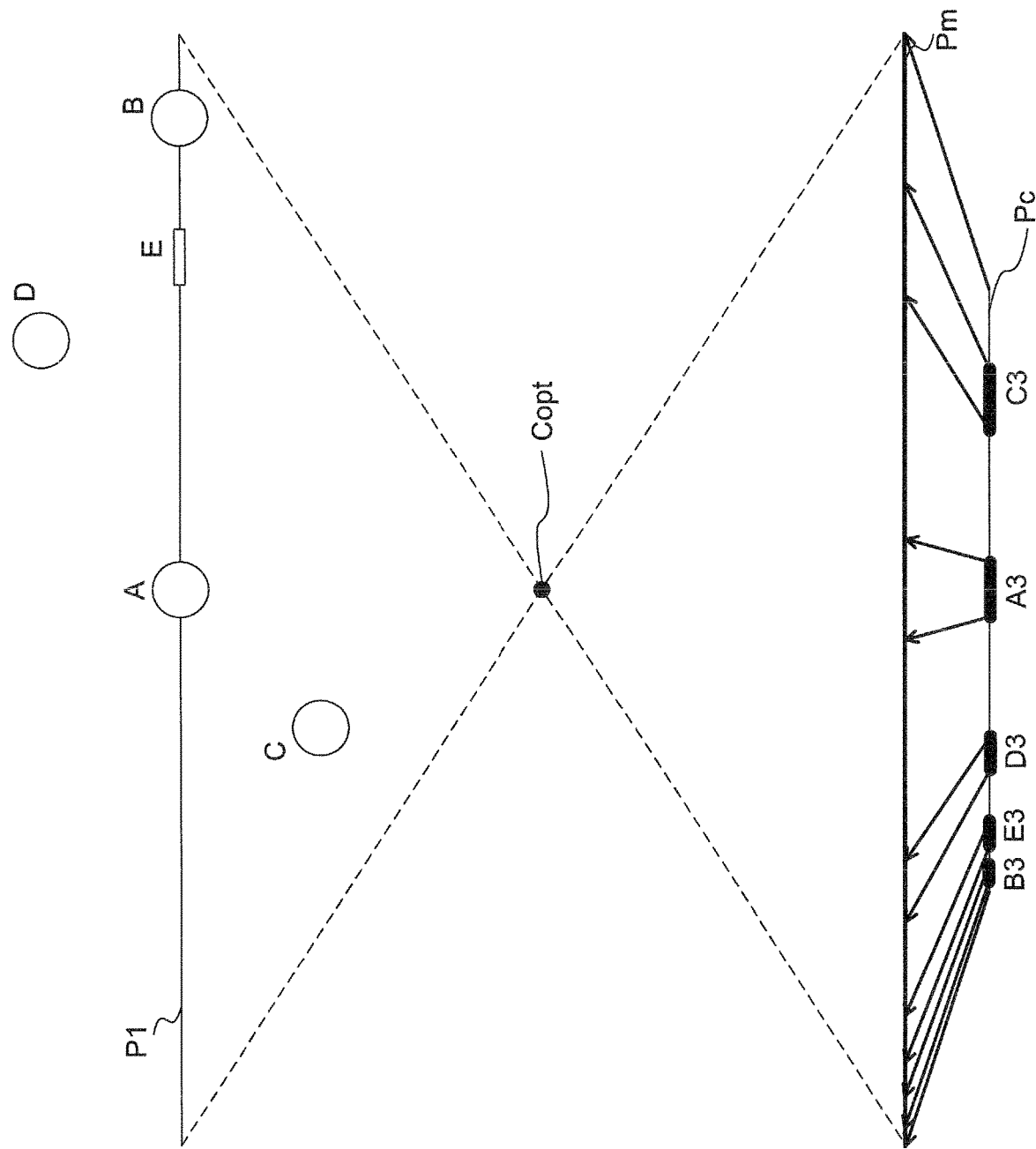
FIG. 5E is a view for explaining the principle for correcting distortion seen in a wide-angle image.

Next, as shown in FIG. 5C, a corrected mapping plane Pc is set parallel to the mapping plane Pm. Each point (pixel) mapped on the spherical surface Ps is mapped onto the corrected mapping plane Pc by orthogonal projection. In other words, each point on the spherical surface Ps is mapped at the position of the foot of a perpendicular drawn from the spherical surface Ps onto the corrected mapping plane Pc. FIG. 5D is a view for explaining a state in which each point on the spherical surface Ps is mapped on the corrected mapping plane Pc in this manner. At this time, the region onto which the points on the corrected mapping plane Pc are mapped is smaller than the region of the original mapping plane Pm. Therefore, as shown in FIG. 5E, each point on the corrected mapping plane Pc is mapped (that is, enlarged) onto the mapping plane Pm so as to return to the same size as that of the original mapping plane Pm.

Figure 5F:
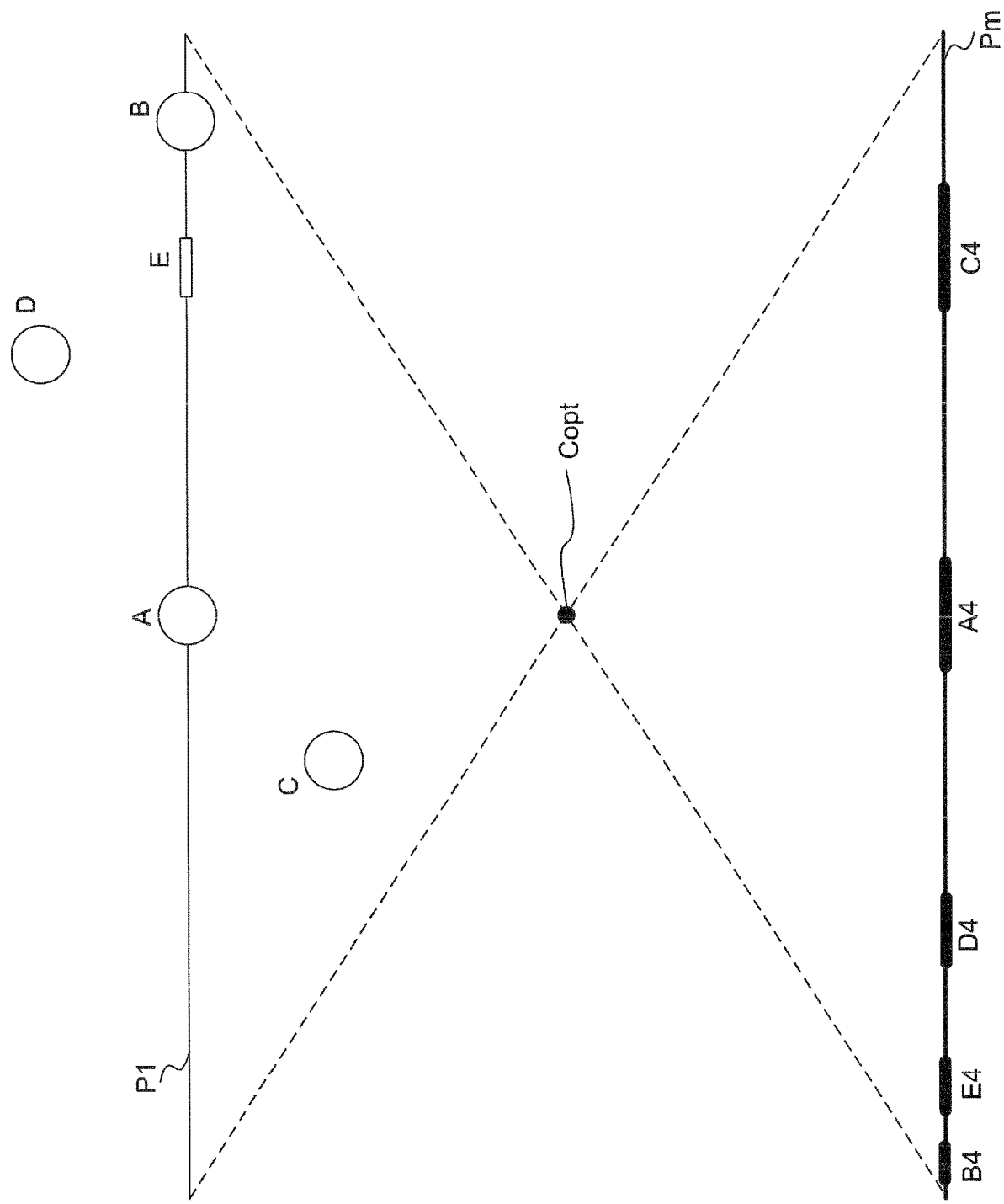
FIG. 5F is a view for explaining the principle for correcting distortion seen in a wide-angle image.

FIG. 5F is a view for explaining the final state of the mapping plane Pm after mapping is executed as described above. FIG. 5F indicates that the distortion of the mapped image (B4) of the sphere B placed at an end of the region and having a large distortion is smaller than that shown in FIG. 4B. Obviously, the wide-angle distortion is corrected. As described above, the wide-angle distortion seen in the wide-angle image is corrected by mapping the pixels on the mapping plane Pm onto the spherical surface Ps once and then mapping them from the spherical surface Ps onto the mapping plane Pm.

That is, wide-angle distortion correction is performed as follows:

0) virtually arranging the captured images on the mapping plane Pm such that the normal line of the mapping plane Pm passing through the centers of the captured images passes through the center of the spherical surface Ps;

1) mapping from the mapping plane Pm onto the spherical surface Ps (mapping F) (FIGS. 5A and 5B);

2) mapping from the spherical surface Ps onto the corrected mapping plane Pc (mapping G) (FIGS. 5C and 5D); and 3) mapping from the corrected mapping plane Pc onto the mapping plane Pm (mapping H) (FIGS. 5E and 5F).

In this case, if each pixel on the mapping plane Pm before correction is P0(x0, y0) and each pixel on the corresponding corrected mapping plane Pm is P1(x1, y1), the following equation holds.

$$P1 = HGF \cdot P0$$

The correspondence relationship between the position P0(x0, y0) of each pixel in the captured image on the mapping plane Pm before wide-angle deformation correction and the position P1(x1, y1) of each pixel in the corrected image is obtained if the mappings F, G, and H are determined. Accordingly, obtaining the correspondence relationship in advance and giving information indicating the relationship to the panorama image correcting unit 14 and the clipping processor 18 allows the panorama image correcting unit 14 and the clipping processor 18 to obtain pixels in the image before correction which correspond to the respective pixels in the image after wide-angle distortion correction by using the correspondence information. This makes it possible to correct wide-angle distortion in the captured image.

[1-2-2. Clipping and Line-of-Sight Conversion]

The video camera 100 according to this embodiment can generate an image corresponding to the line of sight of the user in a pseudo manner while fixing the camera without moving it. A method of generating an image corresponding to the line of sight in a pseudo manner will be described below with reference to FIGS. 6A to 6F.

The user sets a line of sight SL. For example, the user designates one point Vo (point of interest) in the image. A line connecting the designated point Vo and the optical center (viewpoint Vp) can be set as the line of sight. Alternatively, the user may set an inclination angle φ of the line of sight.

Particularly in the case of a moving image, although the inclination angle of one point or line of sight in the image gradually changes, the user may also designate this change. When the line of sight or the inclination angle of the line of sight is set, an image in a predetermined range is clipped with reference to the viewpoint Vp. Therefore, when the inclination angle of one point or line of sight in the image changes, the position of the clipping region also changes accordingly.

Figure 6A:
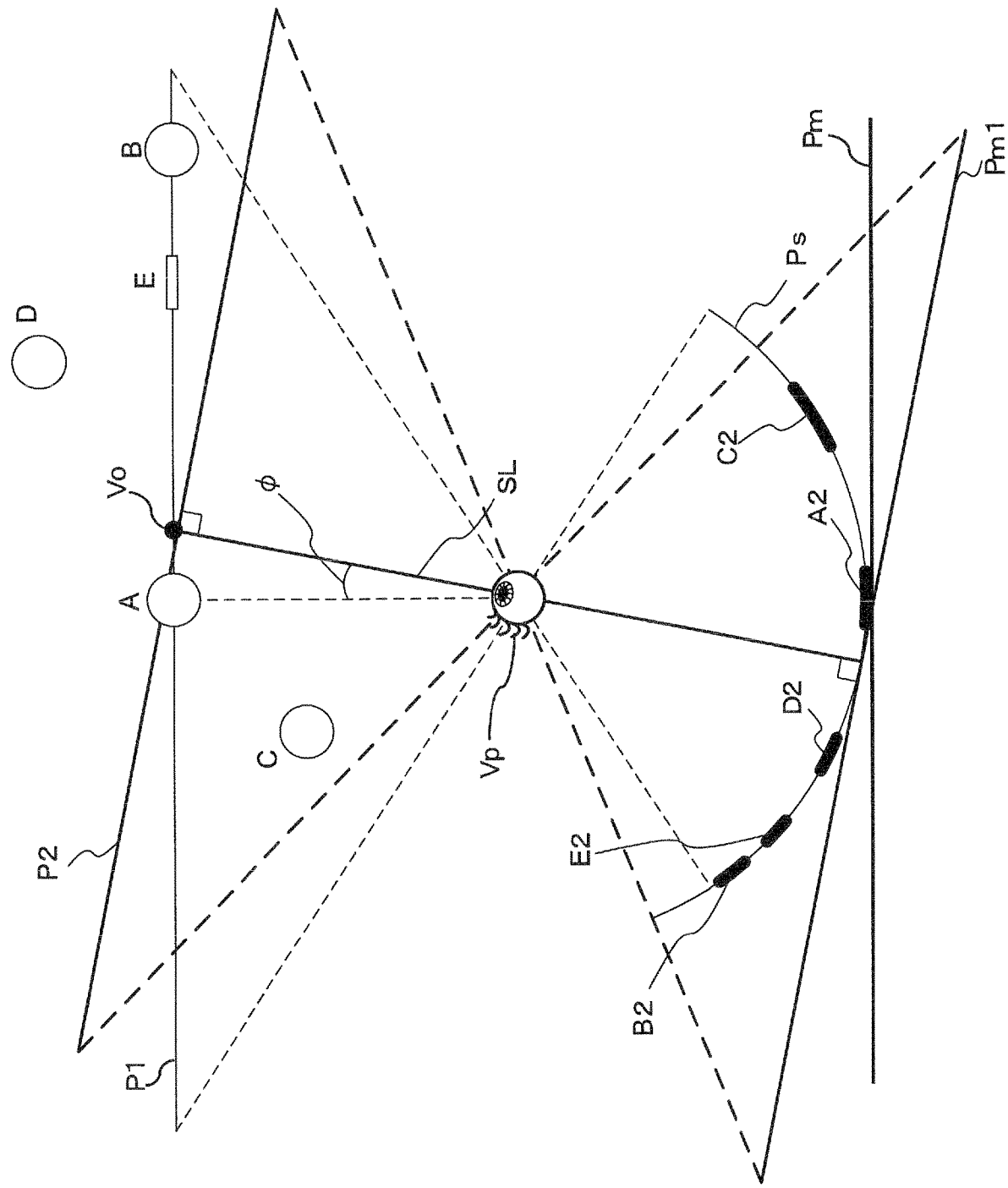
FIG. 6A is a view for explaining a method of clipping part of an image in the line-of-sight direction.

As shown in FIG. 6A, assume that the direction of the line of sight SL of the user is a direction inclined by φ from the direction orthogonal to the plane P1. Further, a plane P2 orthogonal to the line of sight SL and passing through the sphere A is set. Further, on the outside of the spherical surface Ps, a mapping plane Pm1 orthogonal to the line of sight SL is set. In this case, the state shown in FIG. 6A indicates a state in which all the pixels on the mapping plane Pm are mapped onto the spherical surface Ps (see FIG. 5B).

Figure 6B:
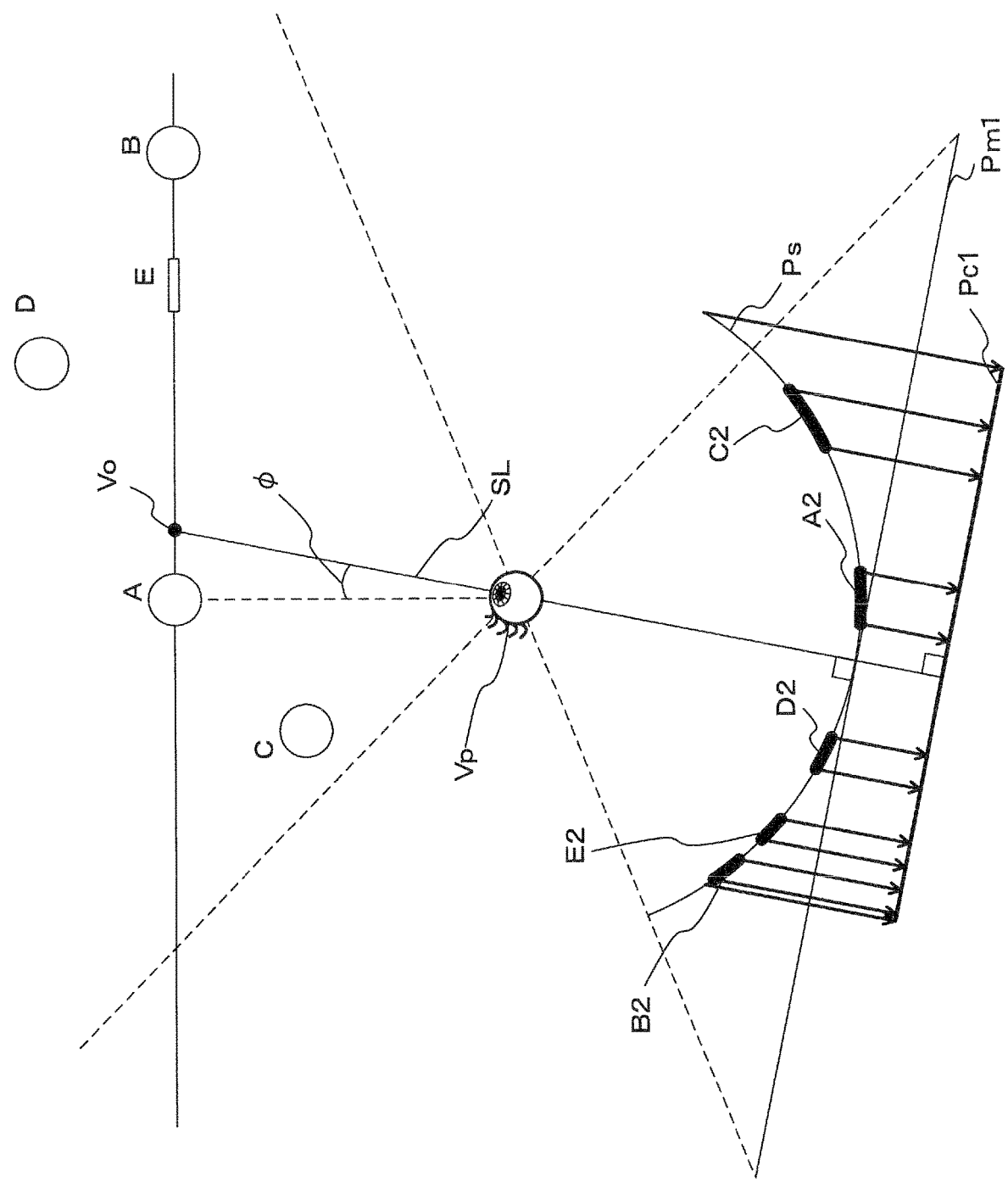
FIG. 6B is a view for explaining a method of clipping part of an image in the line-of-sight direction.
Figure 6C:
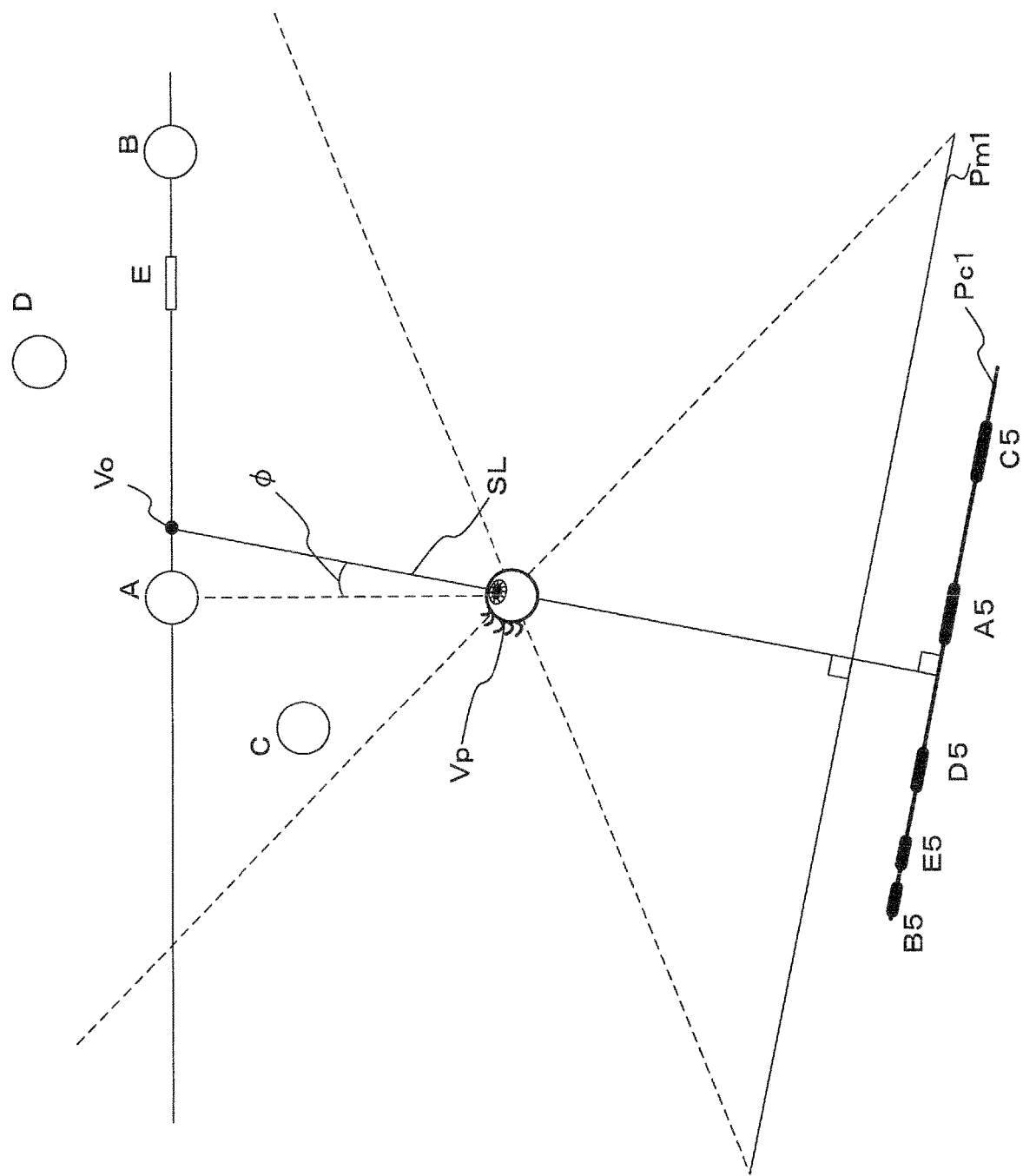
FIG. 6C is a view for explaining a method of clipping part of an image in the line-of-sight direction.
Figure 6D:
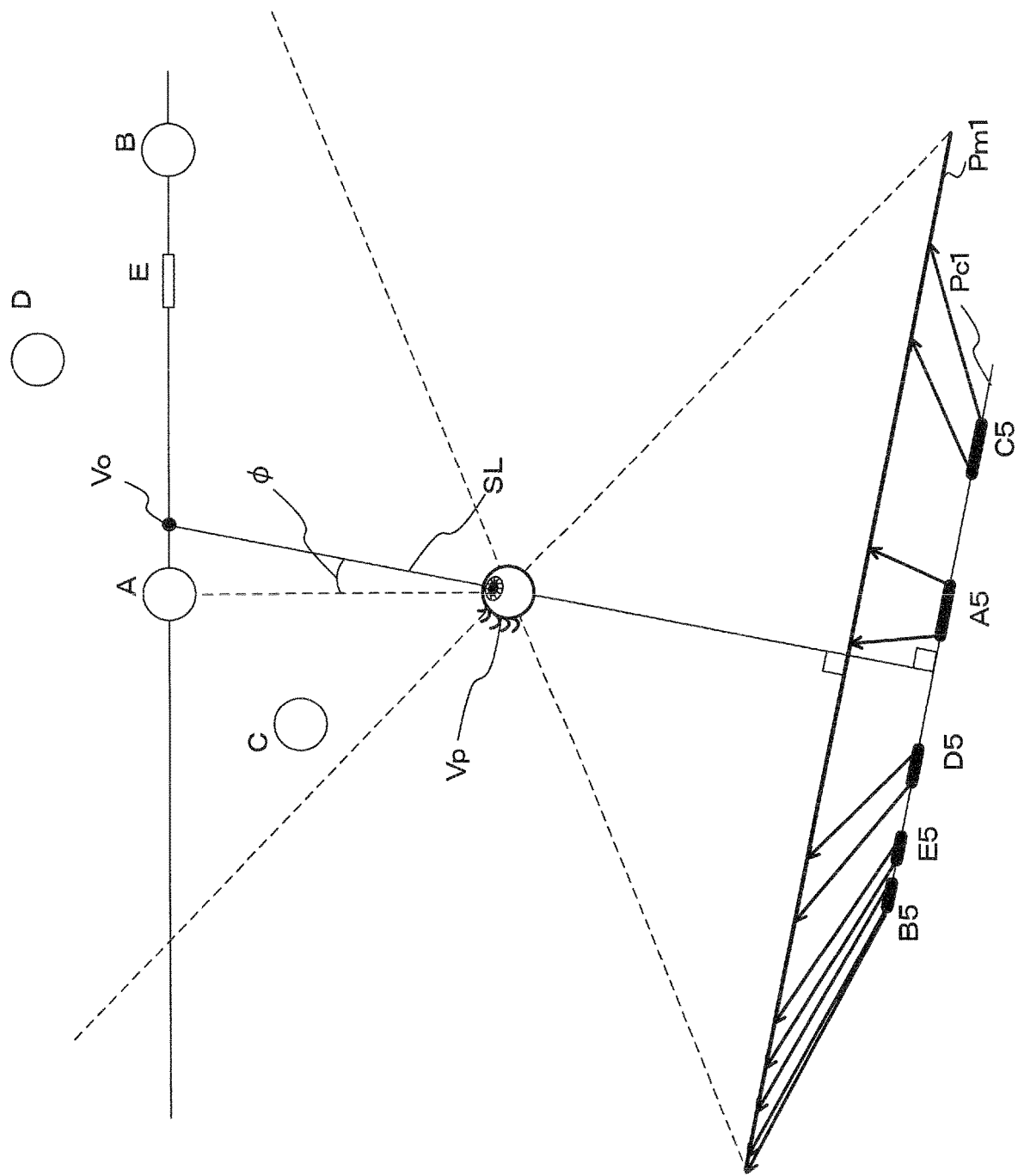
FIG. 6D is a view for explaining a method of clipping part of an image in the line-of-sight direction.

As shown in FIG. 6B, a corrected mapping plane Pc1 is set parallel to the mapping plane Pm1. Each point mapped onto the spherical surface Ps is mapped onto the corrected mapping plane Pc1 by orthogonal projection (parallel projection). In other words, each point on the spherical surface Ps is mapped at the position of the foot of a perpendicular drawn from each point on the spherical surface Ps onto the corrected mapping plane Pc1. FIG. 6C is a view for explaining a state in which each point on the spherical surface Ps is mapped on the corrected mapping plane Pc1 in this manner. At this time, the region onto which the pixels on the corrected mapping plane Pc1 are mapped is smaller than the region of the original mapping plane Pm1. Therefore, as shown in FIG. 6D, each point on the corrected mapping plane Pc1 is mapped onto the mapping plane Pm1 so as to return to the same size as that of the original mapping plane Pm1.

Figure 6E:
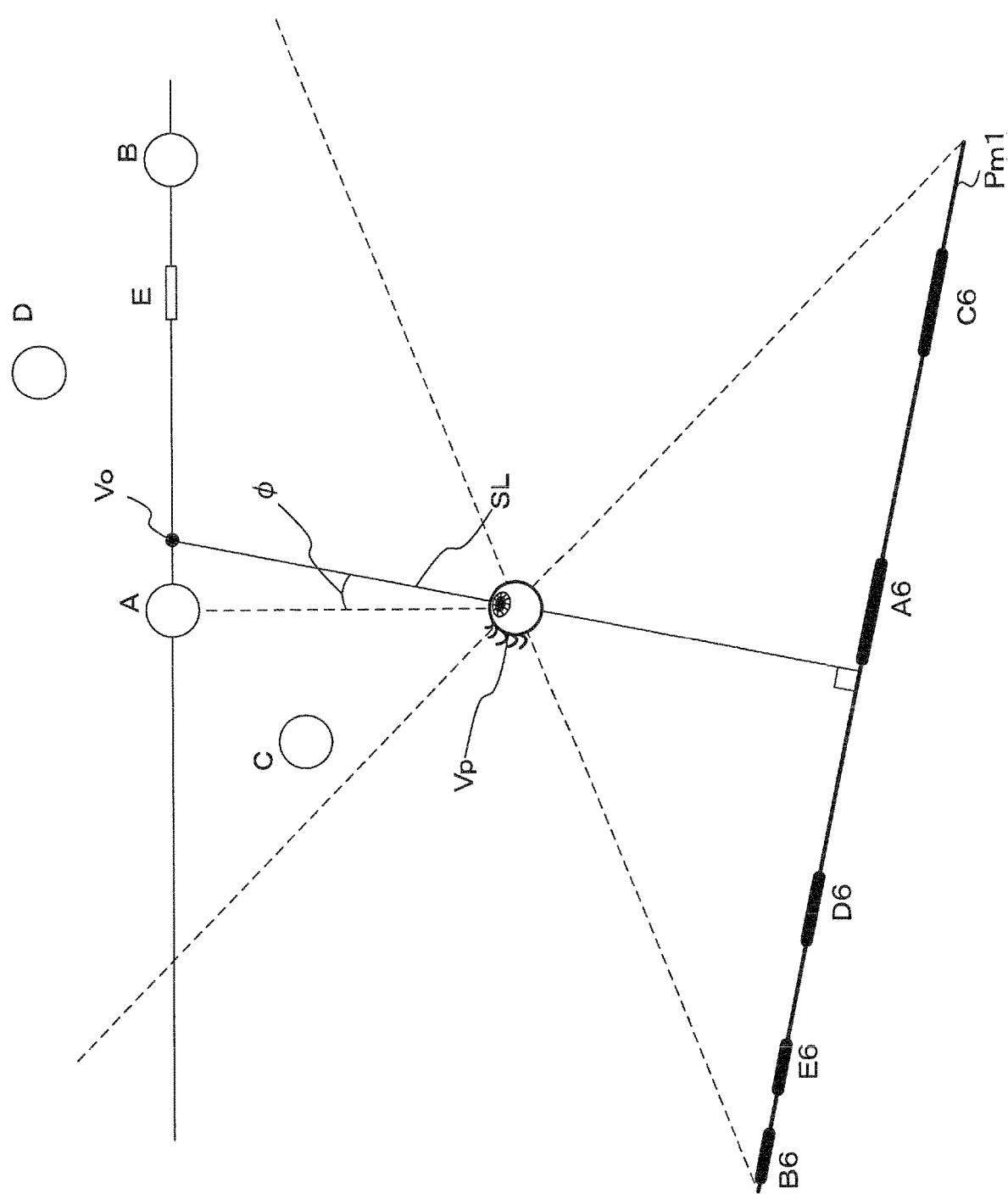
FIG. 6E is a view for explaining a method of clipping part of an image in the line-of-sight direction.
Figure 6F:
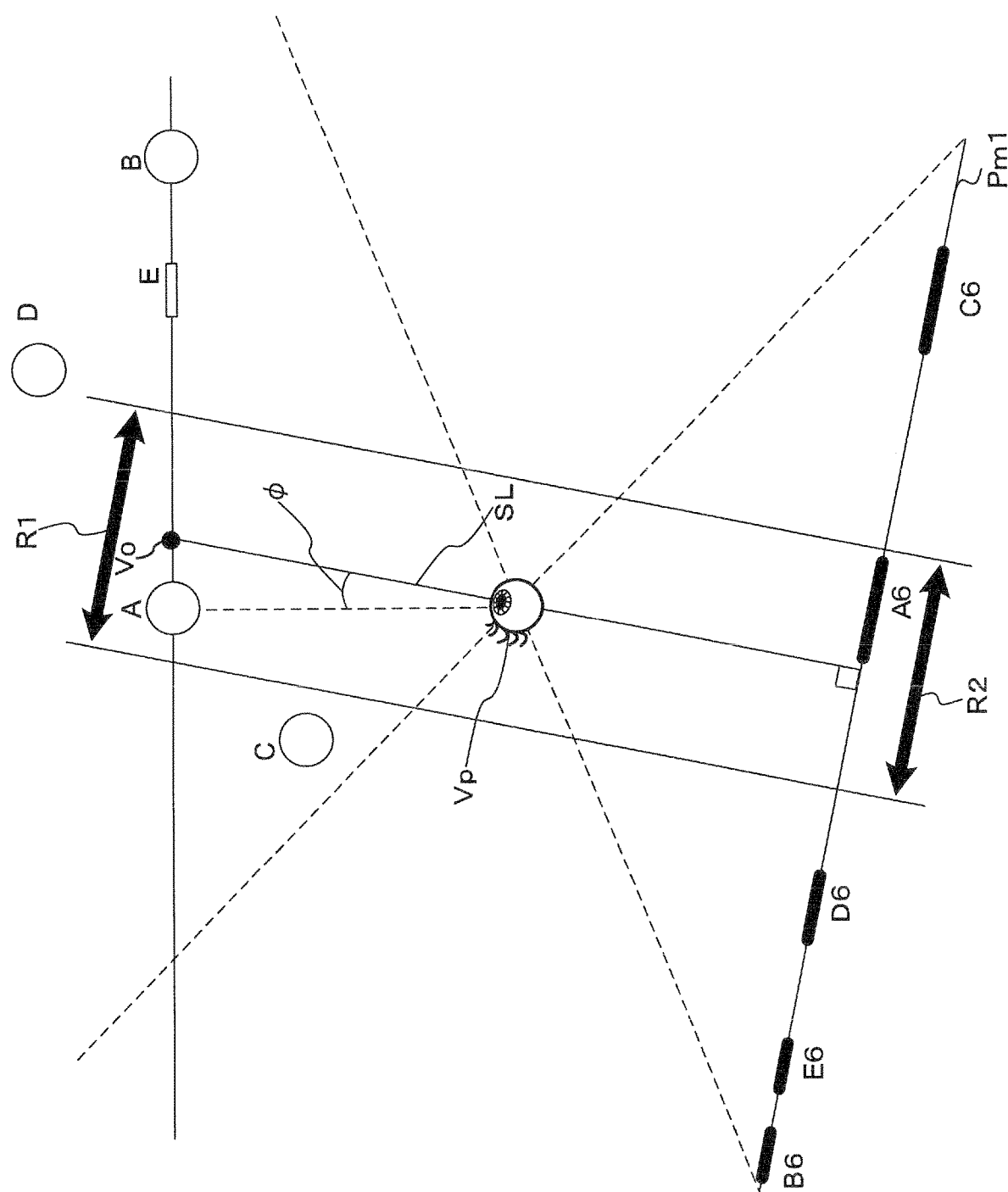
FIG. 6F is a view for explaining a method of clipping part of an image in the line-of-sight direction.
Figure 6G:
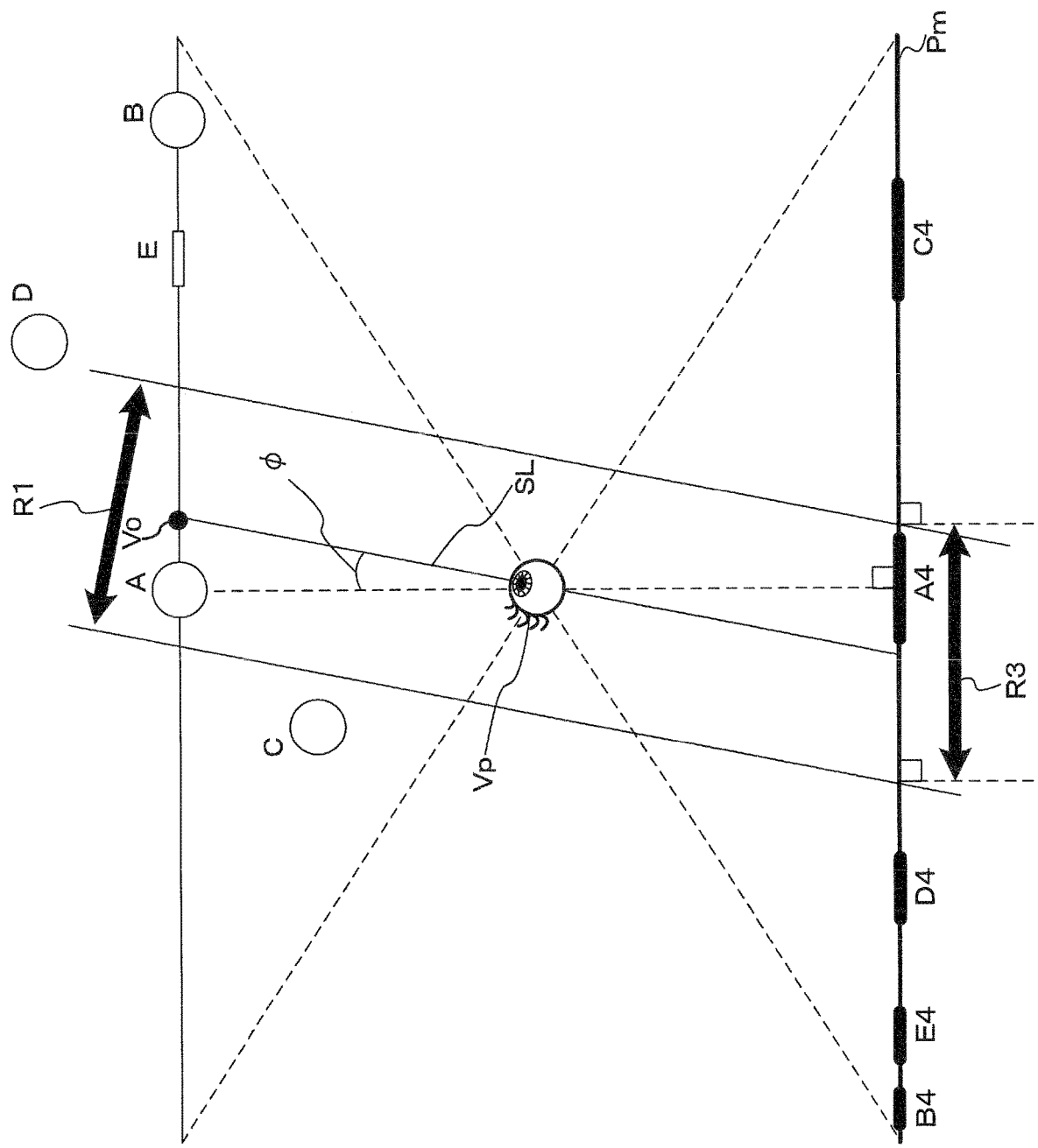
FIG. 6G is a view for explaining a method of clipping part of an image in the line-of-sight direction.

FIG. 6E is a view for explaining the final state of the mapping plane Pm1 after mapping is executed as described above. FIG. 6F is a view for explaining a clipping region (clipping range). Based on the image data generated by the image capturing unit 12, the clipping processor 18 generates an image of a clipping region R2 corresponding to a region R1 in which the user is interested. In the case in which line-of-sight conversion processing (rotation processing) considering the line of sight SL as described above is not performed, an image should be generated by clipping the range of a region R3 on the mapping plane Pm (first plane), as shown in FIG. 6G. On the other hand, by performing the line-of-sight conversion processing as in this embodiment, the pixels on the spherical surface Ps are mapped onto the mapping plane Pm1 (Pc1) inclined by the inclination angle ϕ of the line of sight with reference to the mapping plane Pm. This makes it possible to perform wide-angle distortion correction corresponding to the direction of the line of sight and to generate an image, in a pseudo manner, which the user can see when viewing the region of interest while squarely facing it, thereby generating a natural image.

Figure 7A:
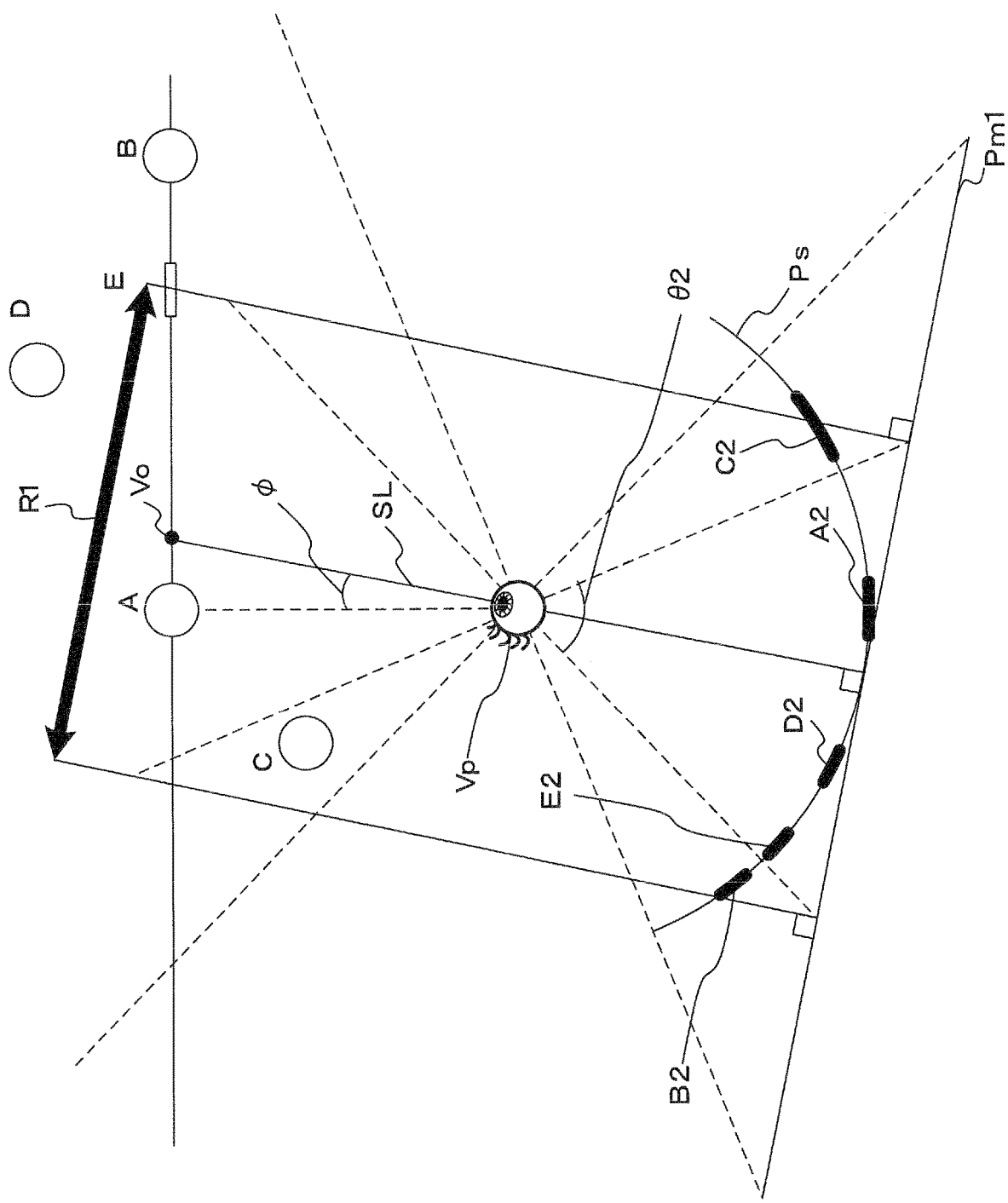
FIG. 7A is a view for explaining another example of the method of clipping part of an image in the line-of-sight direction.
Figure 7B:
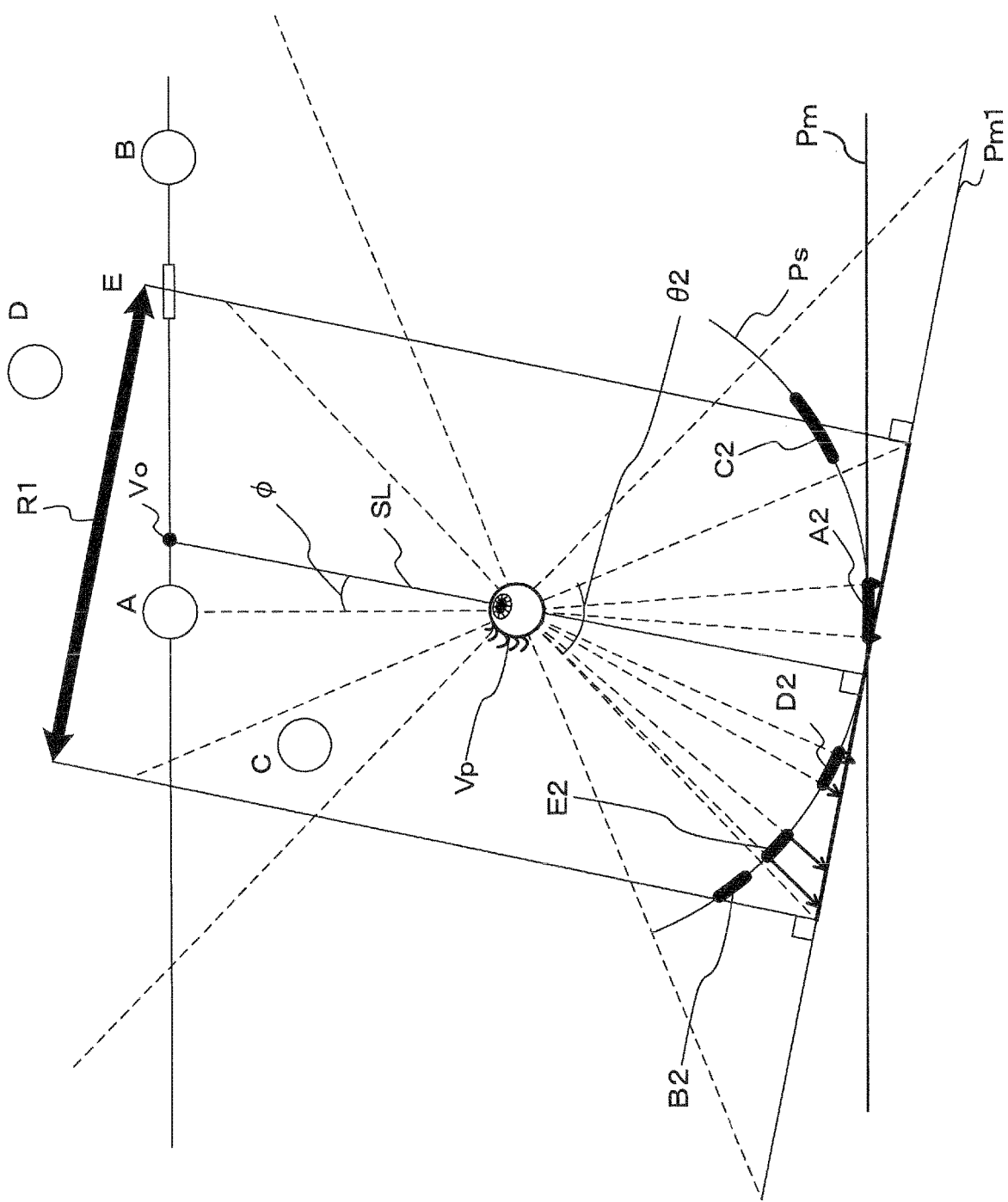
FIG. 7B is a view for explaining another example of the method of clipping part of an image in the line-of-sight direction.
Figure 7C:
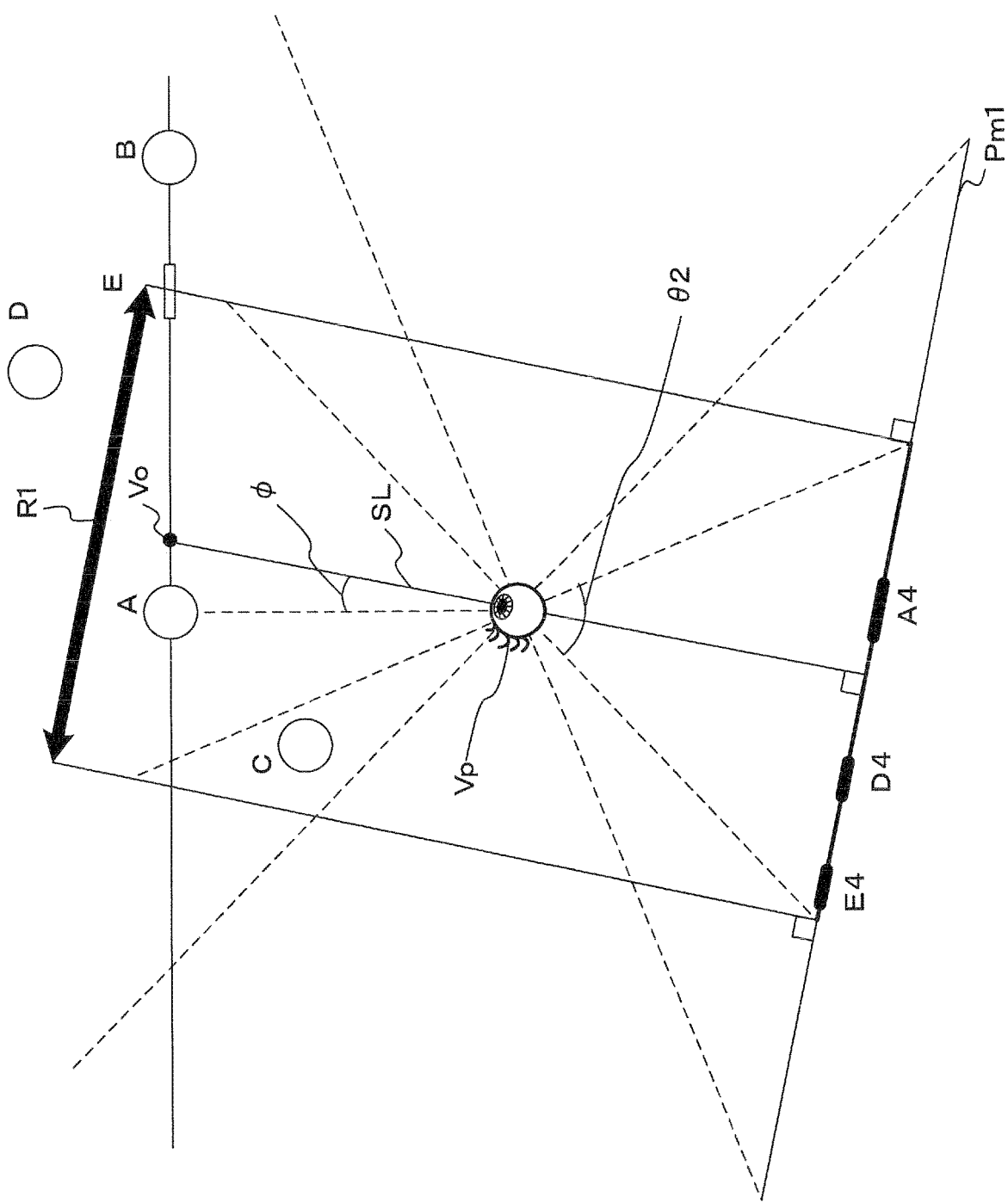
FIG. 7C is a view for explaining another example of the method of clipping part of an image in the line-of-sight direction.

FIGS. 7A to 7C are views for explaining another method for generating an image directed to the sight line in a pseudo manner. In the method described with reference to FIGS. 6A to 6F, each point on the spherical surface Ps is mapped onto the corrected mapping plane Pc1 by orthogonal projection. In contrast to this, FIGS. 7A to 7C illustrate the processing using the mapping by central projection (perspective projection) with the center of the spherical surface Ps being the projection center. That is, as shown in FIG. 7B, each point on the spherical surface Ps is mapped onto the mapping plane Pm1 such that each point on the spherical surface Ps is arranged at the position of the intersection between the normal line of the spherical surface Ps at each point on the spherical surface Ps and the mapping plane Pm 1 within the range corresponding to the clipping region R (see FIG. 7C). In this manner, it is also possible to perform line-of-sight conversion using mapping by central projection.

[1-2-3. Processing by Panorama Image Correcting Unit]

Figure 8A:
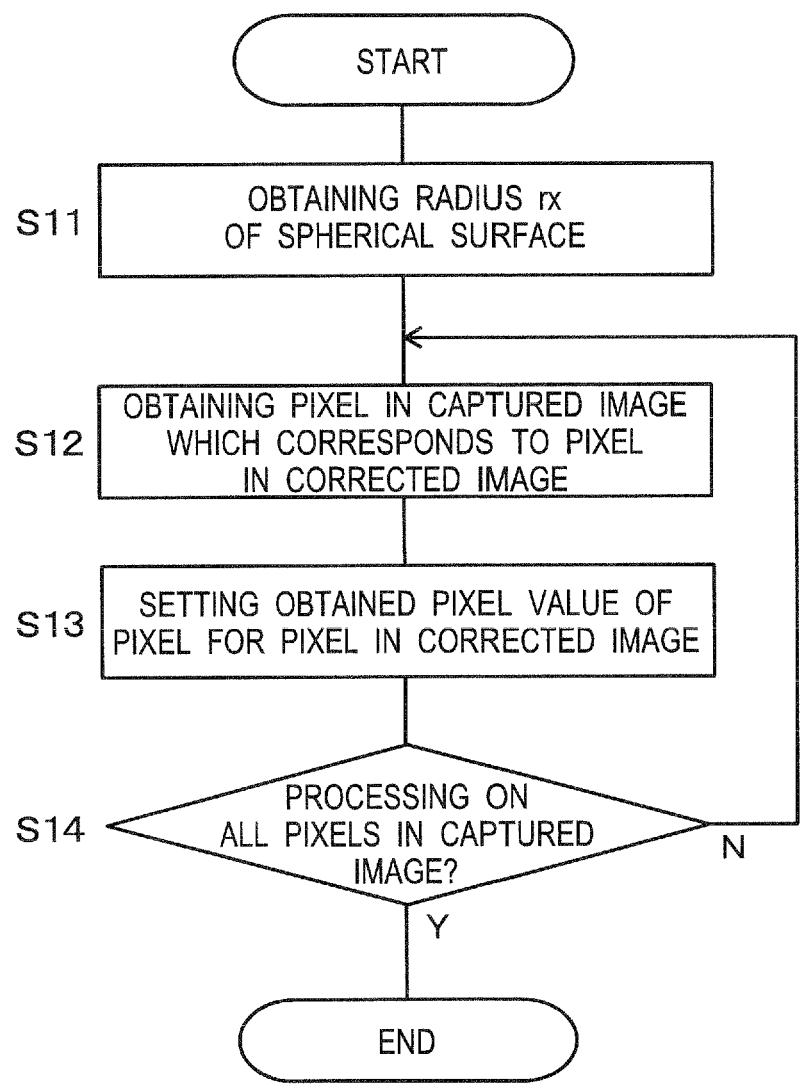
FIG. 8A is a flowchart showing processing performed by a panorama image correcting unit in an image processor.
Figure 8B:
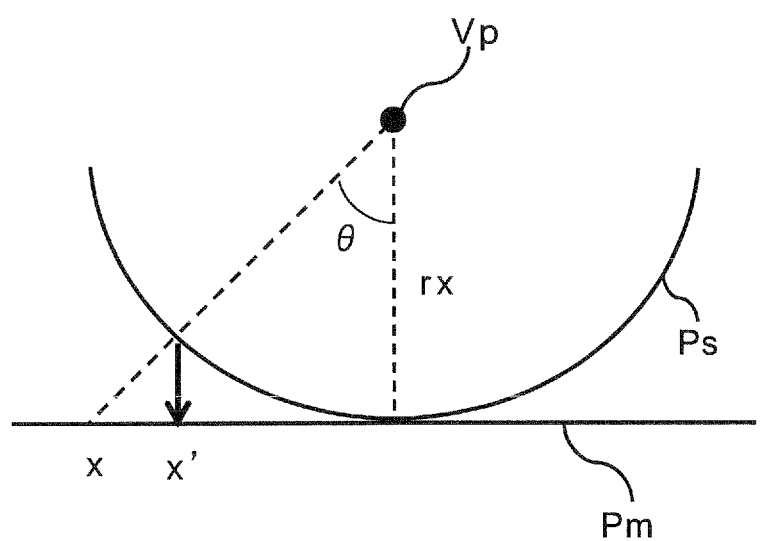
FIG. 8B is a view for explaining the correspondence relationship between pixel positions before and after wide-angle distortion correction processing.

FIG. 8A is a flowchart for explaining wide-angle distortion correction processing in the panorama image correcting unit 14. FIG. 8B is a view for explaining the correspondence relationship between pixel positions before and after wide-angle distortion correction processing.

The panorama image correcting unit 14 firstly obtains a radius rx of the spherical surface Ps in the horizontal direction (S11). This radius rx can be obtained by the following equation:

$$rx=(H/2)/\tan(A/2) \quad (1)$$

where H is the horizontal size of a captured image, and A is the field angle of the video camera 100.

Next, the panorama image correcting unit 14 obtains a pixel in the captured image which corresponds to one pixel in the corrected image based on a predetermined correspondence relationship (S12). The predetermined correspondence relationship in this case will be described.

In this embodiment, as described with reference to FIGS. 5A to 5F, wide-angle distortion correction is performed by performing two mappings. The predetermined correspondence is information indicating the correspondence relationship between the horizontal position (x) of each point on the mapping plane Pm before the two mappings and the horizontal position (x') of each point on the mapping plane Pm after the two mappings when the two mappings are executed, and is represented by the following equation (see FIG. 8B).

$$x=rx \cdot \tan \theta \quad (2)$$

$$\text{for } \theta=a \sin(x'/rx) \quad (2b)$$

According to equation (2) given above, it is possible to know at which position in the image before correction the position of each point (pixel) in the corrected image in the horizontal direction corresponds.

Similarly, the position (y) in the vertical direction can be obtained by the following expression:

$$y=ry \cdot \tan \theta \quad (3)$$

$$\text{for } \theta=a \sin(y'/ry) \quad (3b)$$

where y' is the vertical position of a pixel in the corrected image, and y is the vertical position of a pixel in the captured image which corresponds to the pixel in the corrected image. A spherical radius ry in the vertical direction is the distance from the viewpoint Vp to the mapping plane pm. That is, ry is obtained by the following equation.

$$ry=rx \cdot \cos \theta \quad (4)$$

The panorama image correcting unit 14 can determine which pixel in the captured image corresponds to each pixel in the corrected image using equations (2) and (3) given above.

When a corresponding pixel is obtained for each pixel, the panorama image correcting unit 14 sets the obtained pixel value of the corresponding pixel as the pixel value of one pixel in the corrected image (S13).

The panorama image correcting unit 14 performs the above processing in steps S12 and S13 on all the pixels in the corrected image (S14). The above processing makes it possible to correct wide-angle distortion in the captured image. In the above description, for the sake of descriptive convenience, an example in which the depression angle or the elevation angle of the video camera 100 is 0° has been described. If the video camera 100 has a depression angle or elevation angle other than 0°, the values of rx and ry may be further changed (corrected) in accordance with the depression angle or the elevation angle. That is, depending on the depression angle or the elevation angle of the video camera 100, the manner of tilting and/or panning the mapping plane Pm1 with respect to the mapping plane Pm may be adjusted. Even in an image acquired by a tilt lens camera whose inclination of the image capturing plane in the camera can be changed, processing can be performed in the same manner as in the case of having a depression angle or an elevation angle.

[1-2-4. Processing by Clipping Processor]

Figure 8C:
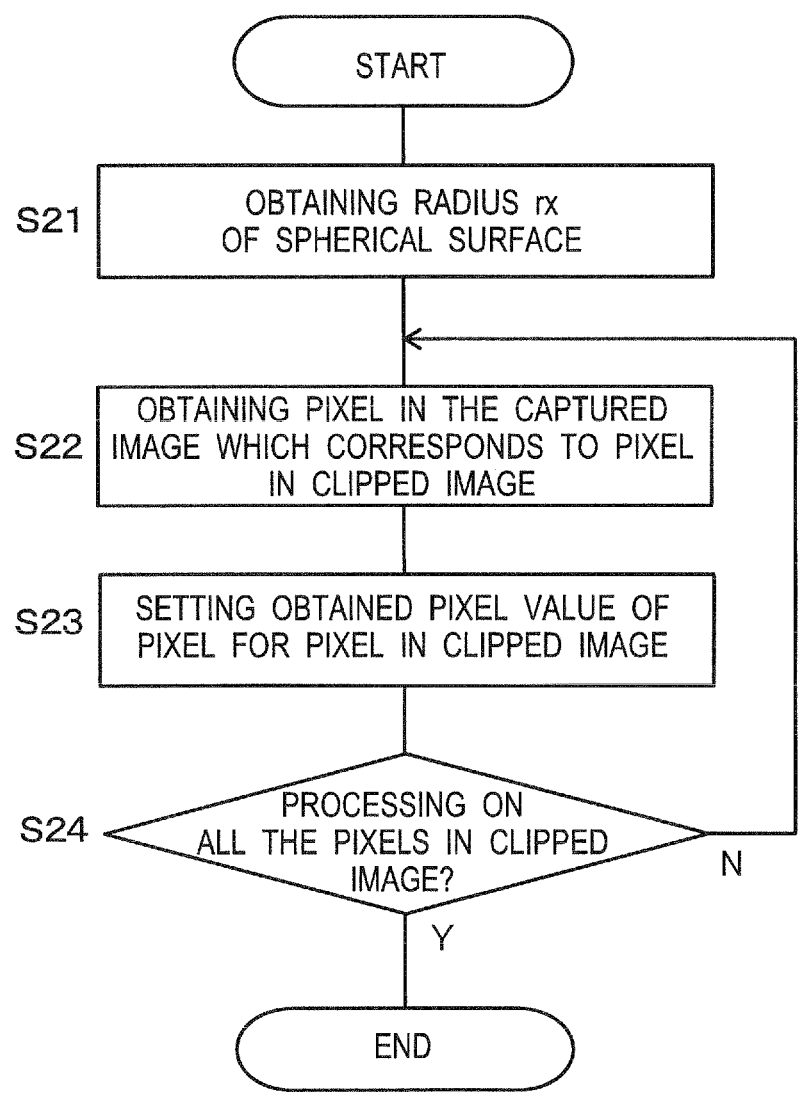
FIG. 8C is a flowchart showing processing performed by a clipping processor in the image processor.
Figure 8D:
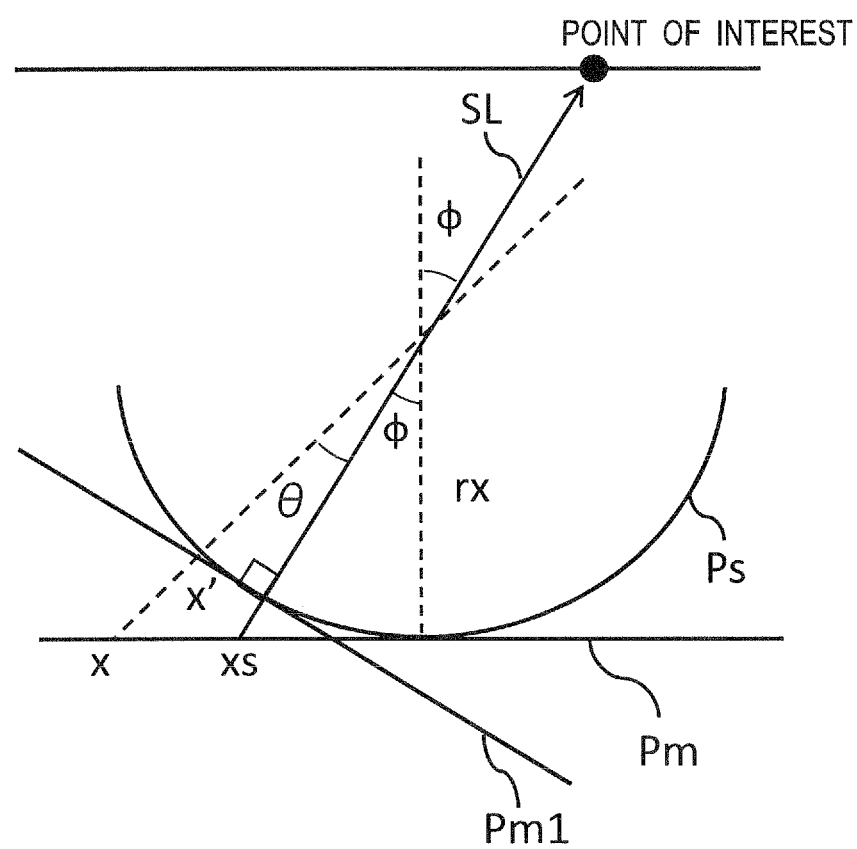
FIG. 8D is a view for explaining the correspondence relationship between pixel positions before and after line-of-sight conversion processing.

FIG. 8C is a flowchart for explaining the clipping processing (including line-of-sight conversion) in the clipping processor 18. FIG. 8D is a view for explaining the correspondence relationship between pixel positions before and after the processing. A clipping region is set in the captured image in advance before the main clipping processing is started. The clipping region is set based on, for example, the position of an object set by the user or automatically recognized in the captured image. The line of sight SL of the user (that is, the point on the image to which the user is paying attention) is previously designated.

The clipping processor 18 performs clipping processing using mapping by orthogonal projection described with reference to FIGS. 6A to 6F or mapping by central projection described with reference to FIGS. 7A to 7C. Clipping processing using central projection described with reference to FIGS. 7A to 7C will be described below. In the case of clipping processing using orthogonal projection, processing similar to the processing described in the panorama image correcting unit 14 described above may be performed on pixels in the clipping range.

Referring to FIGS. 8C and 8D, the clipping processor 18 firstly obtains the radius rx of the spherical surface Ps in the horizontal direction (S21).

$$rx=(H/2)/\tan(A/2) \quad (5)$$

where H is the horizontal size of a captured image, and A is the field angle of the video camera 100.

Next, the clipping processor 18 obtains a pixel in the captured image which corresponds to one pixel in the clipped image based on a predetermined correspondence relationship (S22).

In this case, in the clipping processing, as described with reference to FIGS. 6A to 6F and 7A to 7C, the clipping region is changed (rotated) in accordance with the direction of the line of sight SL. The inclination angle φ of the line of sight SL is obtained by the following equations:

$$\phi x = a\tan(\text{horizontal position of point of interest})/rx \quad (6a)$$

$$\phi y = a\tan(\text{vertical position of point of interest})/rx \quad (6b)$$

where φx is the inclination angle of the line of sight SL in the horizontal direction, and φy is the inclination angle of the line of sight SL in the vertical direction. The point of interest is a point on the image to which the user is paying attention, and corresponds to, for example, the position xs on the mapping plane Pm (see FIG. 8D).

Accordingly, the horizontal position (x) of the pixel on the captured image corresponding to each pixel in the clipped image, with consideration being given to the direction of the line of sight, is obtained by the following equation (see FIG. 8D).

$$x = rx \cdot \tan(\theta + \phi x) \quad (7)$$

$$\text{for } \theta = a\tan(x'/rx) \quad (7b)$$

According to equation (7), it is possible to know at which position (x) in the captured image the horizontal position (x') of each point (pixel) in the clipped image corresponds.

Similarly, the vertical position can be obtained by the following equation:

$$y = ry \cdot \tan(\theta + \phi y) \quad (8)$$

$$\text{for } \theta = a\sin(y'/ry) \quad (8b)$$

where y' is the vertical position of the pixel in the clipped image, and y is the vertical position of a pixel in the captured image which corresponds to the pixel in the clipped image. The spherical radius ry in the vertical direction is obtained by the following equation.

$$ry = rx \cdot \cos(\theta + \phi x) \quad (9)$$

The clipping processor 18 can determine which pixel in the captured image corresponds to each pixel in the clipped image using equations (7) and (8) given above.

When a corresponding pixel is obtained for each pixel, the clipping processor 18 sets the obtained pixel value of the corresponding pixel as the pixel value of one pixel in the clipped image (S23).

The clipping processor 18 performs the above processing in steps S22 and S23 on all the pixels in the clipped image (S24). This makes it possible to obtain a clipped image obtained by clipping part of the region from the image capturing apparatus. Also, at this time, because the clipping region is set in accordance with the line of sight of the user, a clipped image that looks more natural can be obtained.

[1-2-5. Image Clipping]

Figure 9:
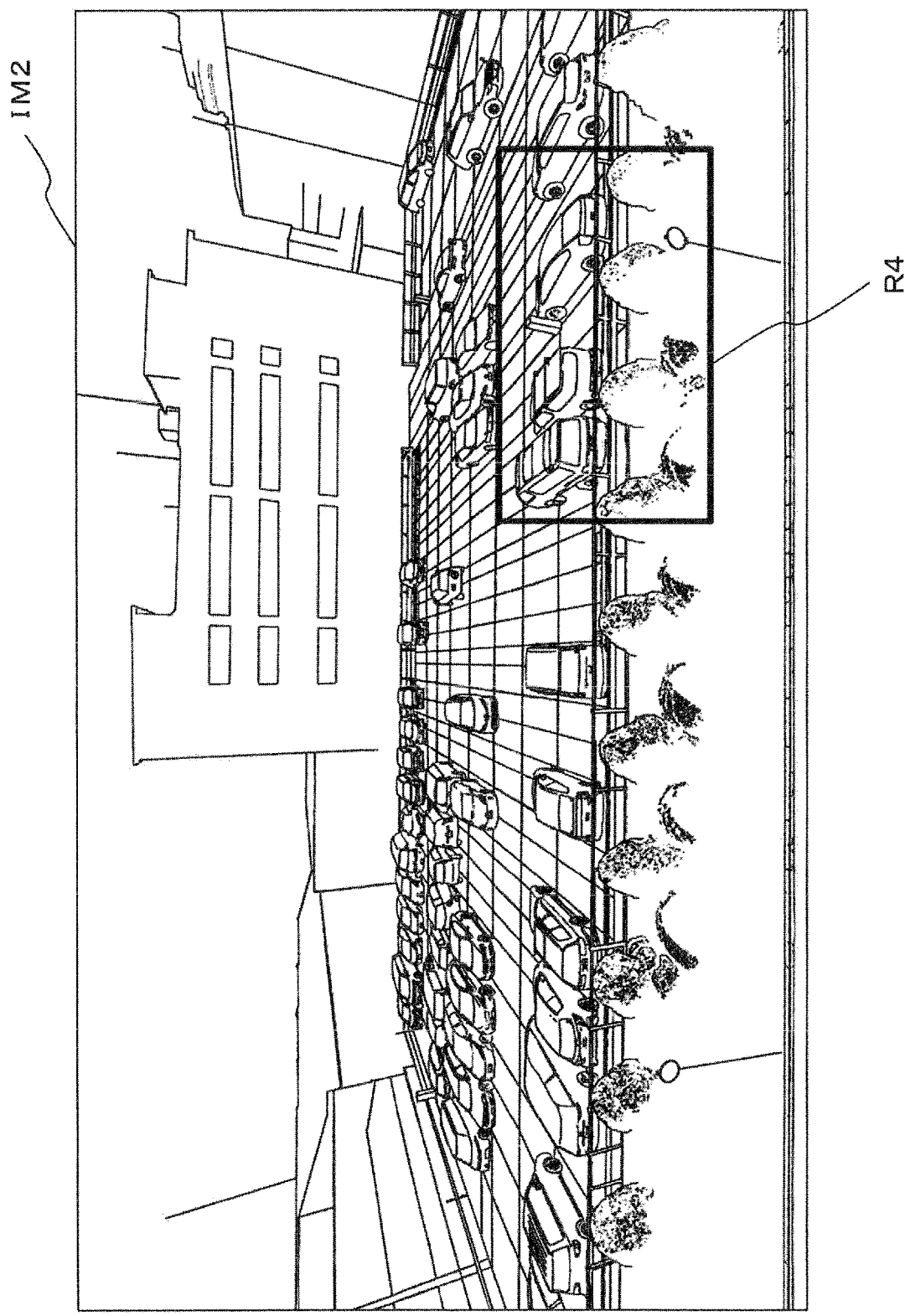
FIG. 9 is a view showing a clipping range in a panorama image.
Figure 10:
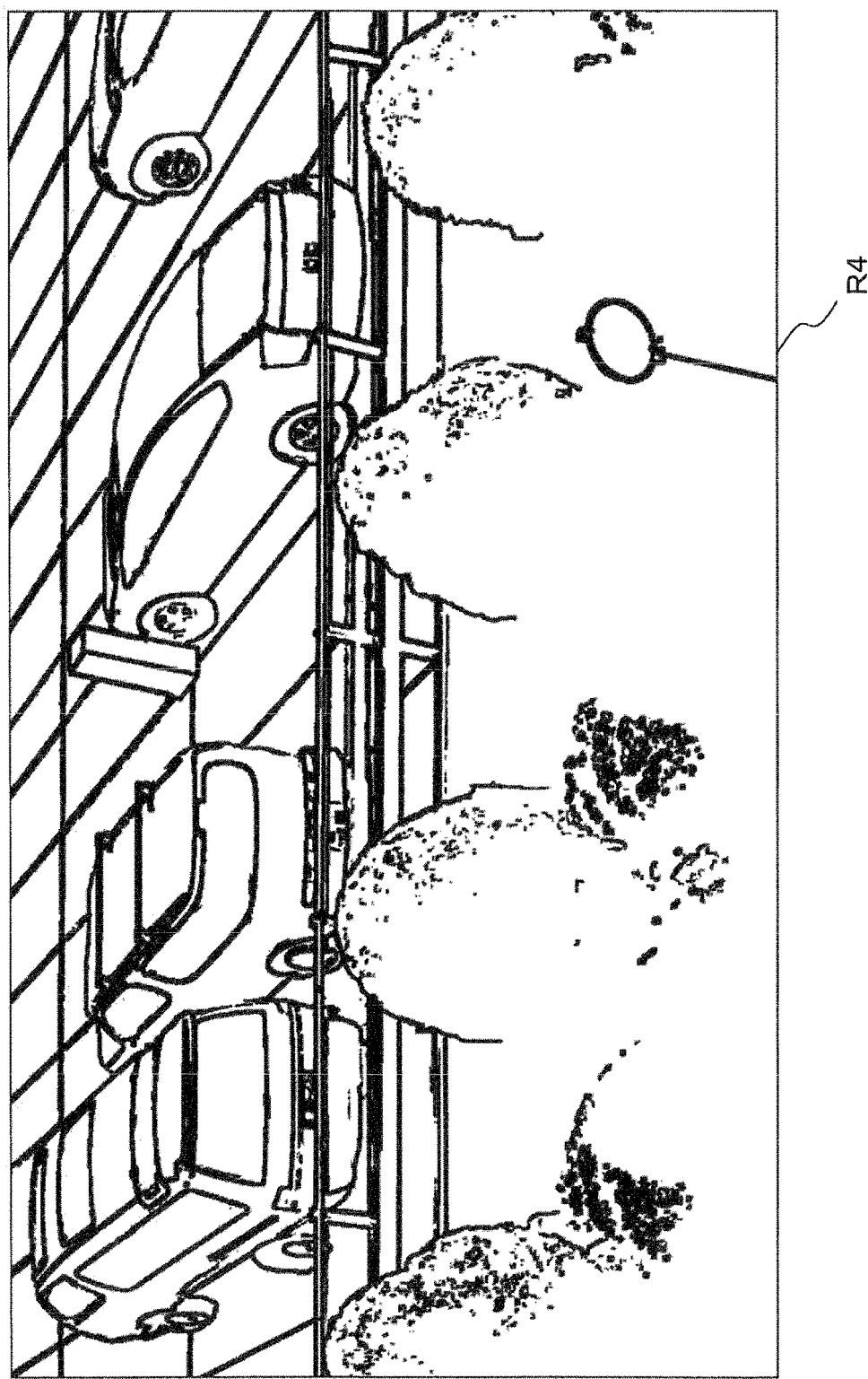
FIG. 10 is an enlarged view of an image (before distortion correction and line-of-sight direction conversion) in the clipping range.
Figure 11:
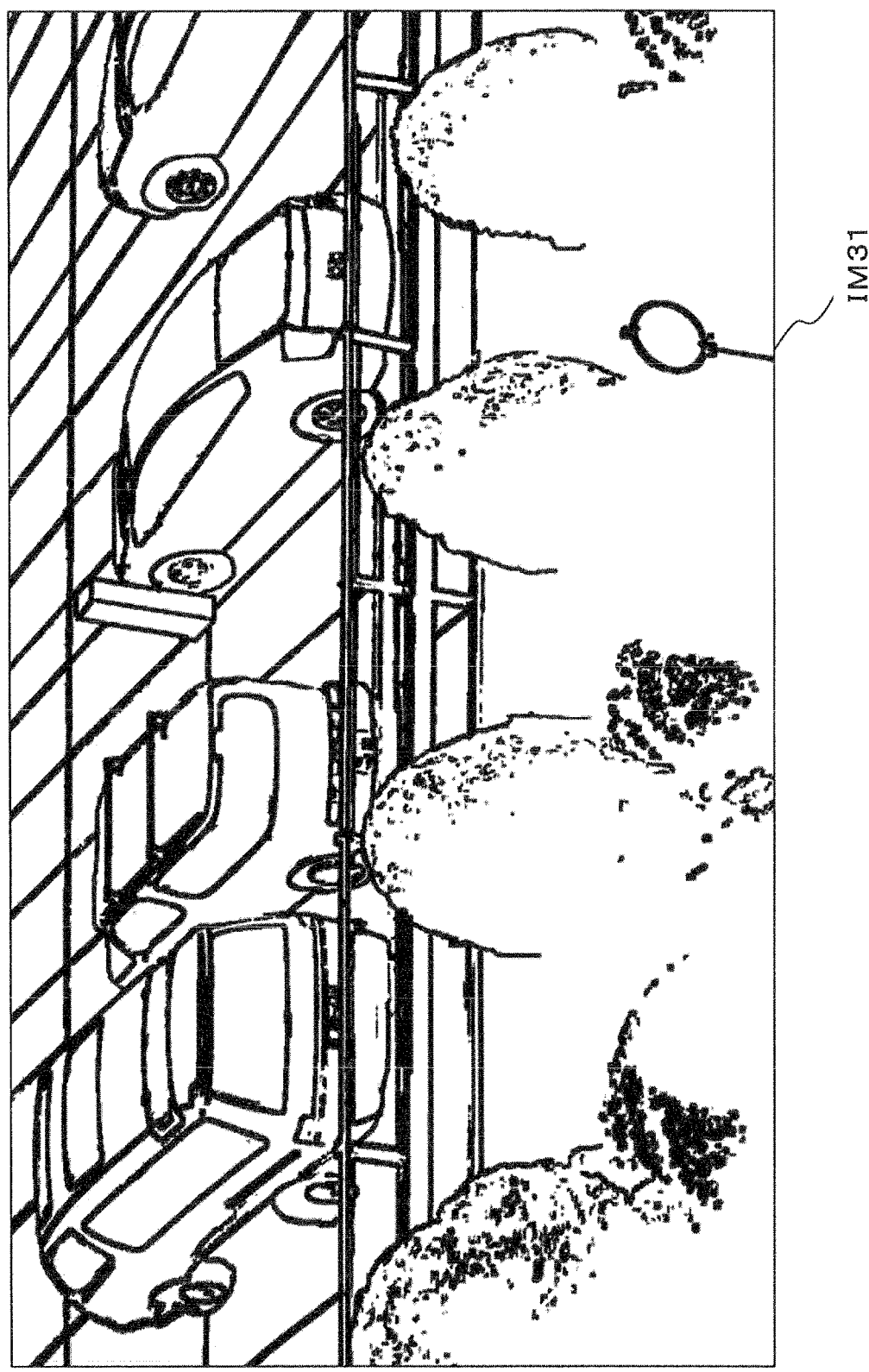
FIG. 11 is a view showing an image after distortion correction and line-of-sight direction conversion for the image shown in FIG. 10.

FIG. 9 is a view for explaining the clipping region in the panorama image. A clipping region R4 is set in a panorama image IM2. Referring to FIG. 10, the region of the clipping region R4 is enlarged and displayed. FIG. 11 is a view showing the clipped image IM31 generated by clipping from the clipping region R4 by the clipping processor 18. Wide-angle distortion correction and line-of-sight conversion are applied to the clipped image IM31 shown in FIG. 11. In the clipped image, processing may be performed so as to include the whole clipping region before processing (the range not included in the original clipping range may also be included in the processed image), or processing may be performed with respect to only the pixels in the clipping range before processing (a range included in the original clipping range is not sometimes included in the processed image).

Figure 12:
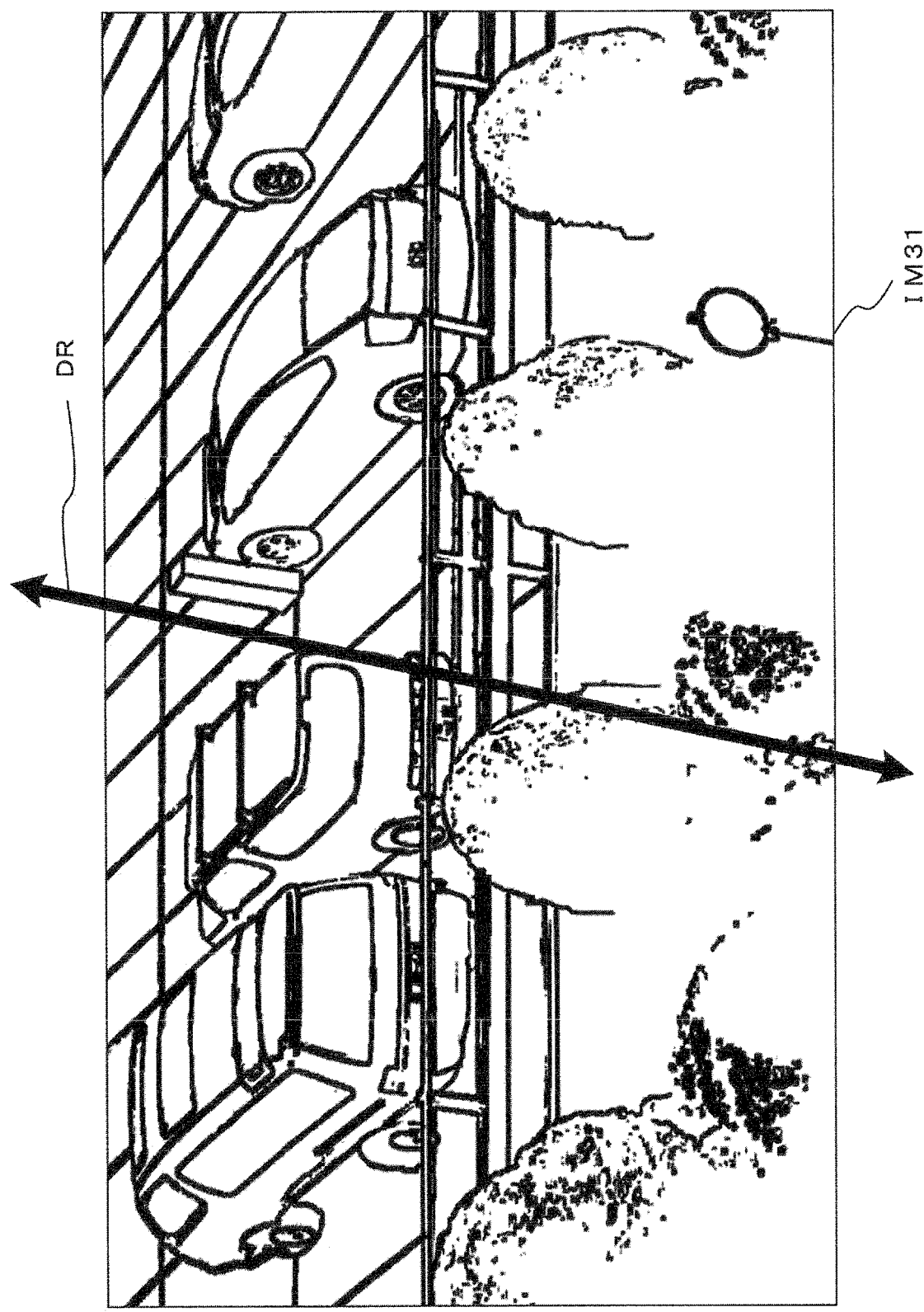
FIG. 12 is a view showing the vertical direction (arrow DR) in the image shown in FIG. 11.
Figure 13:
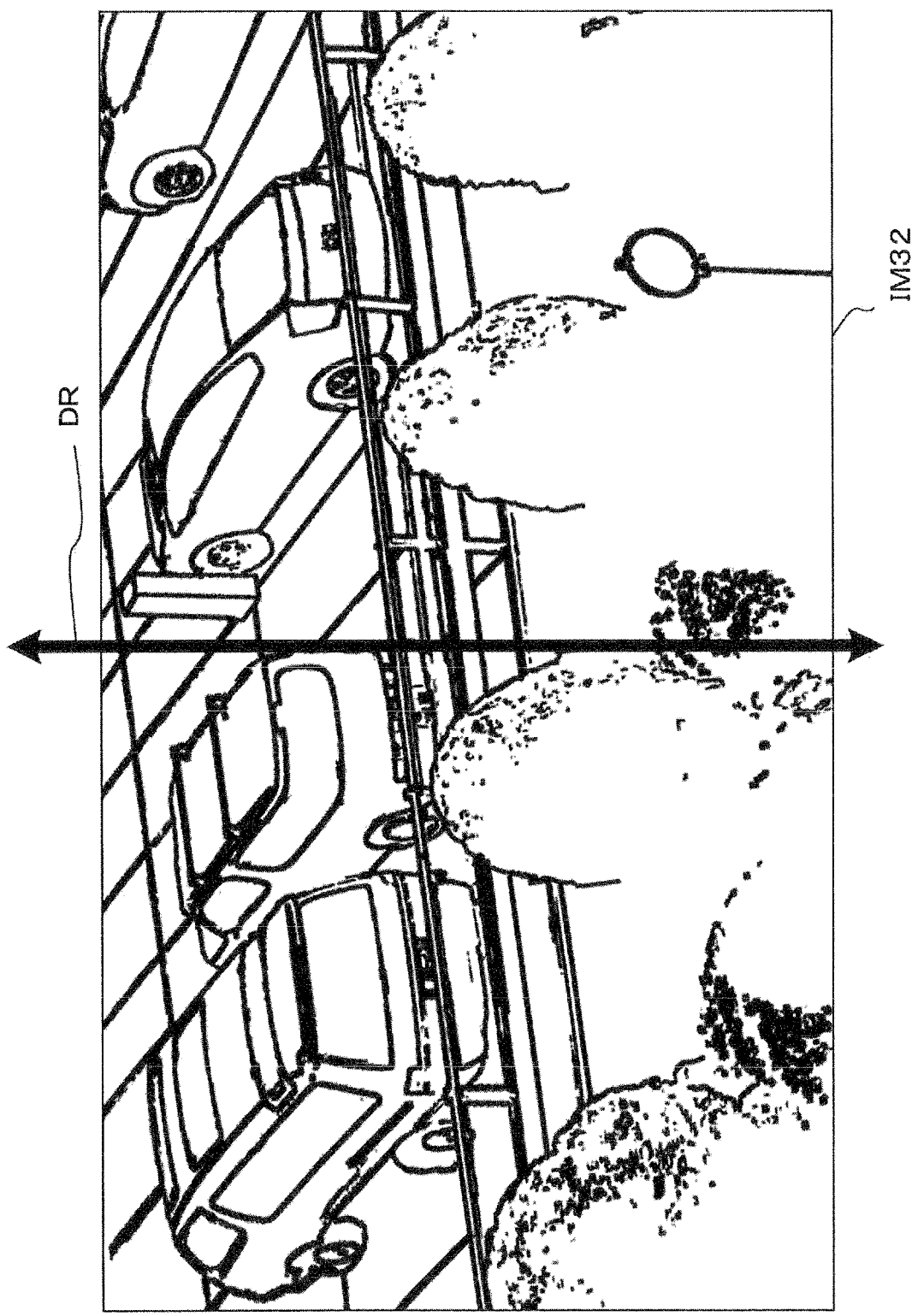
FIG. 13 is a view showing a clipped image generated such that the vertical direction (arrow DR) of an object in the image coincides with the vertical direction of the image.

When the camera has a depression angle or elevation angle, in the horizontal direction (x-axis) and the vertical direction (y-axis) in the captured image, the object which should stand in the vertical direction to the horizon in a real space may not be vertical and may be skewed in the image. That is, within the clipped image, the object standing in the vertical direction may not be vertical and may be inclined. For example, FIG. 12 shows the clipped image IM31. Referring to FIG. 12, an arrow DR indicates the direction of an object standing in the vertical direction. As indicated by the arrow DR, in the image shown in FIG. 12, the direction of the object standing in the vertical direction is inclined without being vertical. Accordingly, when such an event can occur in advance, predetermined processing may be performed such that an object standing in the vertical direction originally becomes vertical even in the clipped image. For example, when an image is projected onto a spherical surface, the image may be rotated by the depression angle or the elevation angle, or a vertical edge of the processed image may be detected and the image may be rotated by the inclination of the edge. This makes it possible to obtain a naturally looking image. FIG. 13 shows an image obtained as a result of such processing. When there is a possibility that pixels are lost due to rotation, the image before clipping may be rotated so as not to lose any pixel, or rotation processing may be performed in a range wider than the clipping range. Alternatively, the range including no missing portion may be enlarged/reduced in accordance with the output size.

Figure 14:
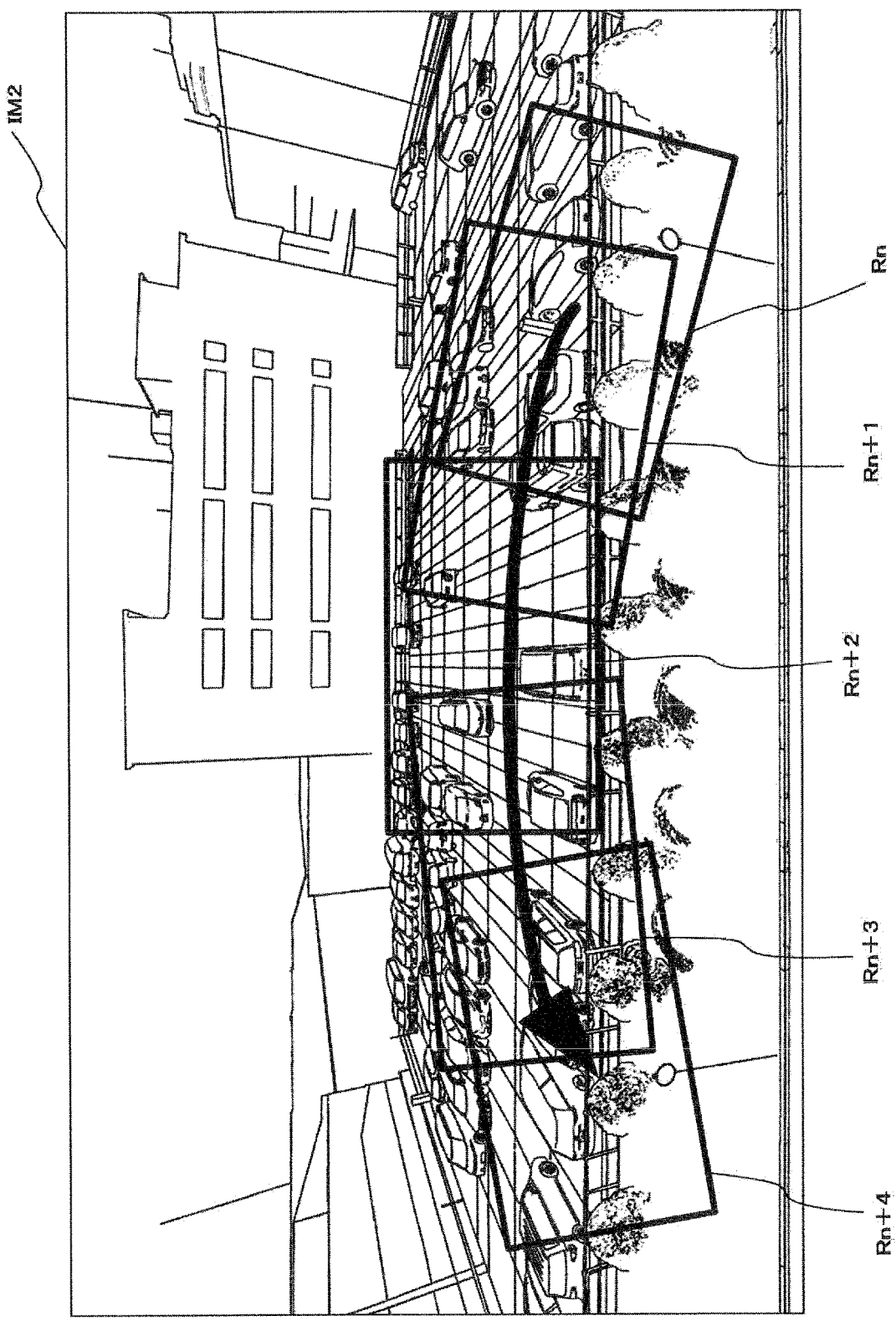
FIG. 14 is a view for explaining a change in clipping range (a change forming an arcuate locus) when partial images are continuously clipped from the panorama image.

By generating clipped images while continuously changing the clipping position, it is possible to obtain images equivalent to images obtained when panning a usual video camera that is disposed at the same position as this video camera 100 and outputs an image having the same size as the clipped image obtained by the video camera 100. FIG. 14 is a view for explaining changes in clipping region. The clipping processor 18 changes the clipping region Rx such that the locus of the center of the clipping region has an arcuate shape. Referring to FIG. 14, along with the lapse of times n, n+1, n+2, . . . , the clipping region changes to clipping regions Rn, Rn+1, Rn+2, . . . . In addition to the position of the clipping region (rectangle), the inclination of the clipping region (rectangle) is also changed with the position of the clipping region. For example, the clipping region may be set such that the object that should stand in the vertical direction is also vertical in the clipped image. Alternatively, the inclination of the clipping region (rectangle) may be changed such that the normal of the arc is orthogonal to a horizontal side of the clipping region. By changing the clipping region in this manner, it is possible to obtain natural images as images obtained when panning a usual video camera that is disposed at the same position as this video camera 100 and outputs an image having the same size as the clipped image obtained by the video camera 100.

Figure 15:
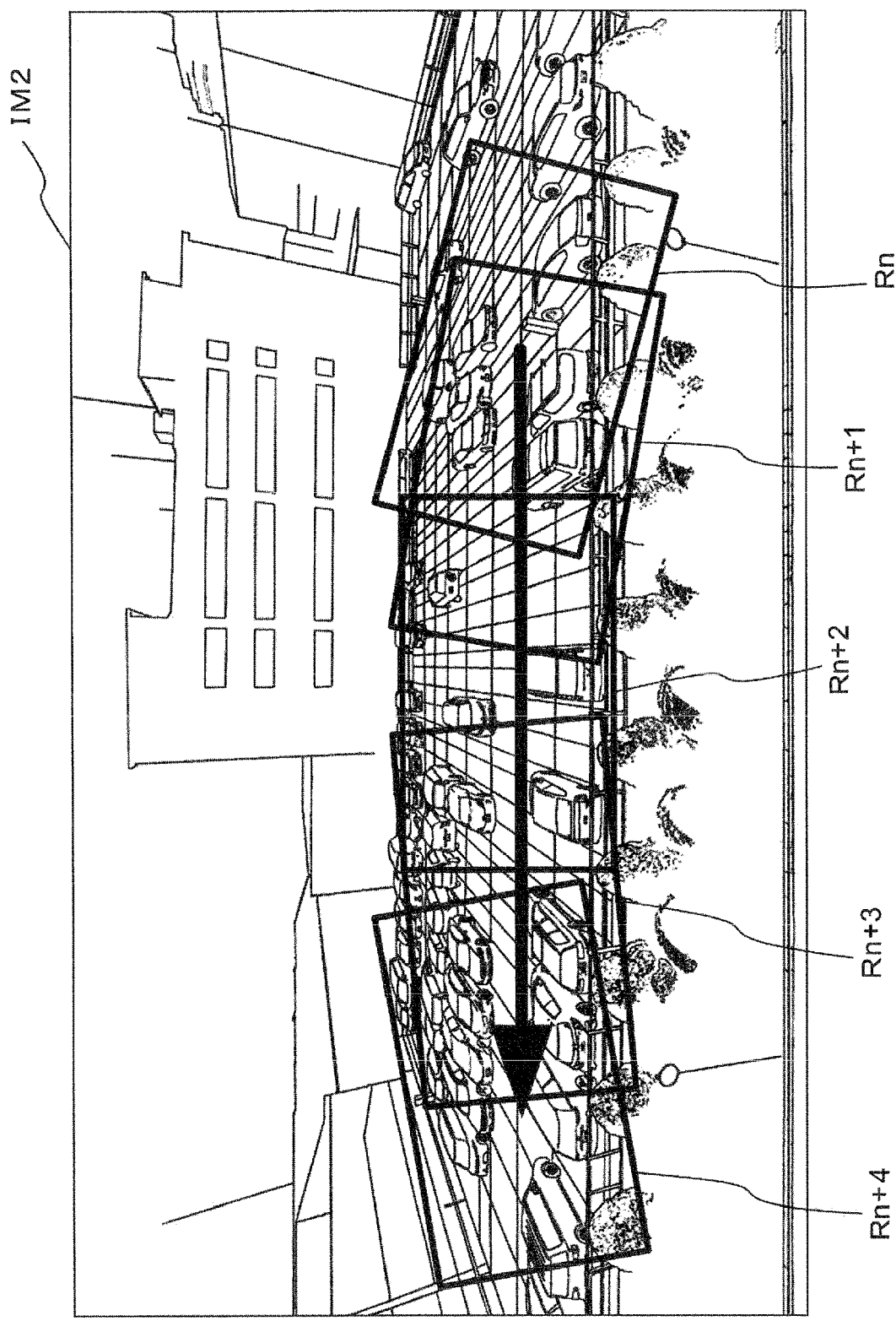
FIG. 15 is a view for explaining a change in clipping range (a change forming a linear locus) when partial images are continuously clipped from the panorama image.

FIG. 15 shows another example of the manner of changing the clipping region. As shown in FIG. 15, the positions of the clipping regions Rn, Rn+1, Rn+2, . . . may be changed such that the locus of the center of the clipping region is linear. In this case as well, the inclination of the clipping region (rectangle) is changed with the position of the clipping region.

In designating a clipping position with respect to a moving image that has been obtained in advance, such as in editing or displaying moving image data that has already been captured, the amount of change in the position of the clipping region may be calculated using a predetermined function. At this time, the user may set the positions of clipping regions in the first and last frames, and the amount of movement between the frames may be calculated using a predetermined function. The predetermined function may be, for example, linear interpolation. Although linear interpolation corresponds to uniform linear motion, the actual panning motion of the cameraman does not become uniform linear motion. Therefore, when linear interpolation is used, a feeling of strangeness sometimes occurs somewhat. In general, when a person moves a camera on a table with his/her hand, the camera moves slowly at the start of movement, gradually increases in speed, then gradually becomes slower near the target position, and finally stops. The amount of change in the position of the clipping region may be calculated using a cumulative distribution function for a normal distribution (an example of a predetermined function) so as to obtain a change in the clipping position in accordance with such natural motion of the camera.

[1-2-6. Effect Obtained by Deformation of Clipping Region]

In the above example, the wide-angle distortion is corrected by mapping onto the spherical surface, but the wide-angle distortion correction method is not limited to this. Wide-angle distortion can be corrected also by deformation of the clipping region. Wide-angle distortion differs in degree (strength) depending on the region of the image (the position in the image). That is, wide-angle distortion occurs more conspicuously in a region farther from the center of the image, that is, in a region closer to an edge of the image, resulting in an image whose length is noticeably longer than that of the shape of the original subject. Because the degree of the wide-angle distortion of an image varies depending on the position in the image as described above, the shape of the clipping region may be changed in accordance with the clipping position in order to correct the wide-angle distortion. A clipping region does not necessarily have a rectangular shape, but sometimes has a trapezoidal shape in some cases. In such a case, a trapezoidal clipped image is converted into a rectangular image (trapezoidal correction). This conversion can correct the wide-angle distortion.

Specifically, in accordance with the extent to which the clipping region approaches an edge of the original image, the clipping region may be set so as to be reduced by the extent of the extension of part of the converted image due to the wide-angle distortion. In other words, the image in a region where the wide-angle distortion is larger needs to be further reduced in the conversion. Accordingly, the length of each of the four sides of a clipping region (rectangular region) is changed in accordance with the position of the clipping region in the original image. For this reason, the shape of the clipping region becomes a trapezoid from a rectangle as it approaches an end of the original image, and the length of the side on the end side of the original image is longer than the length of the inner side of the original image. This makes it possible to expect the effect of easily reducing wide-angle distortion without mapping to a spherical surface.

Figure 16A:
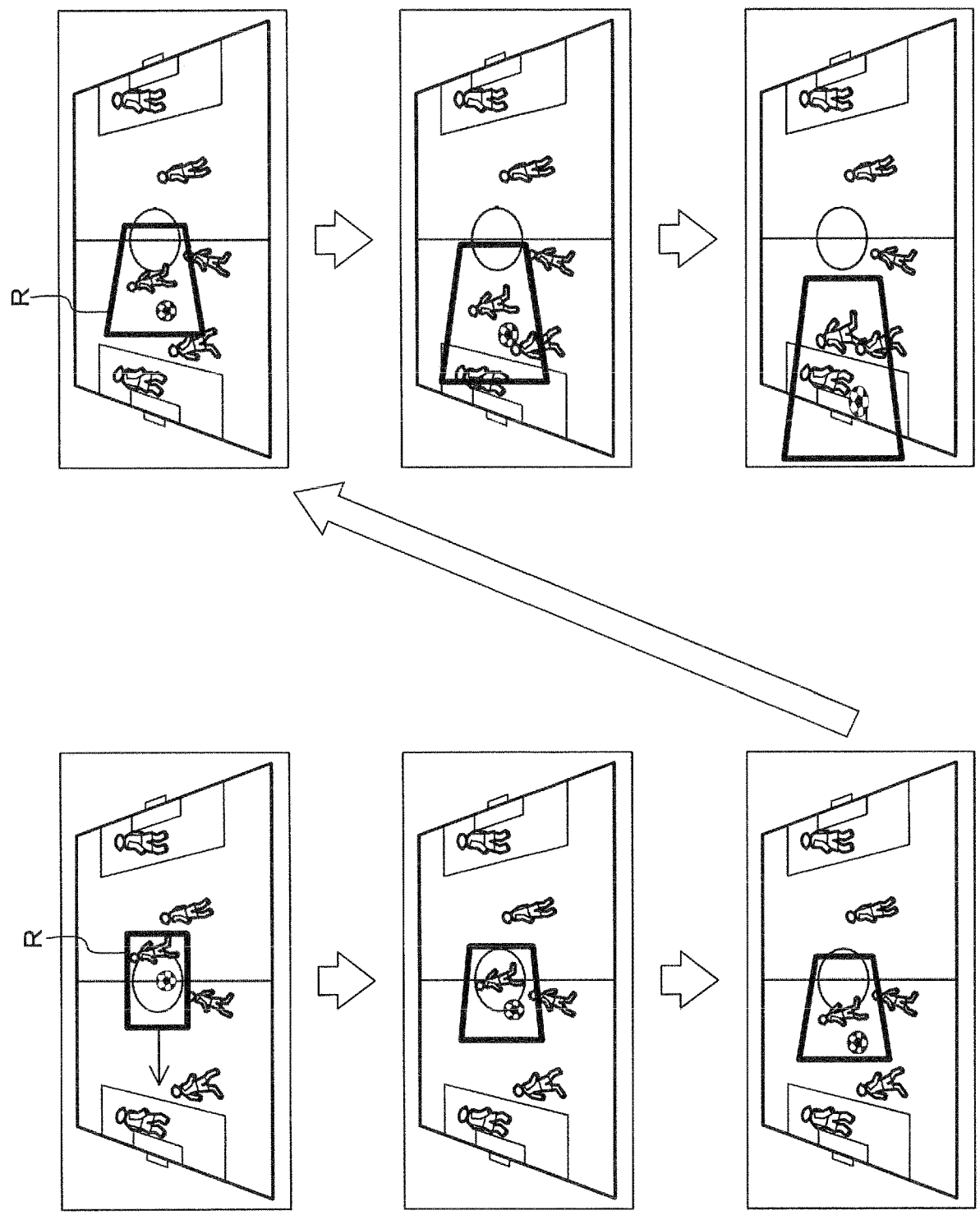
FIG. 16A is a view for explaining correction for reducing wide-angle distortion due to deformation of a clipping region.

As shown in FIG. 16A, as the clipping region R approaches the end, the subjects near the goal are reduced and displayed by making the side on the goal side longer and the horizontal side longer in the clipping region R. This makes it possible to reduce the deformation of the subject elongation due to the wide-angle distortion that has occurred at the edge of the image. With respect to the setting of the length and inclination of a side of the trapezoidal clipping region R, for example, data about the correction amount of wide-angle distortion with respect to the clipping position of the image and calculation formulas for calculating correction amounts are held in advance. Then, based on the held data and the calculation results, the inclination and length of a side are set so as to correct the wide-angle distortion.

Figure 16B:
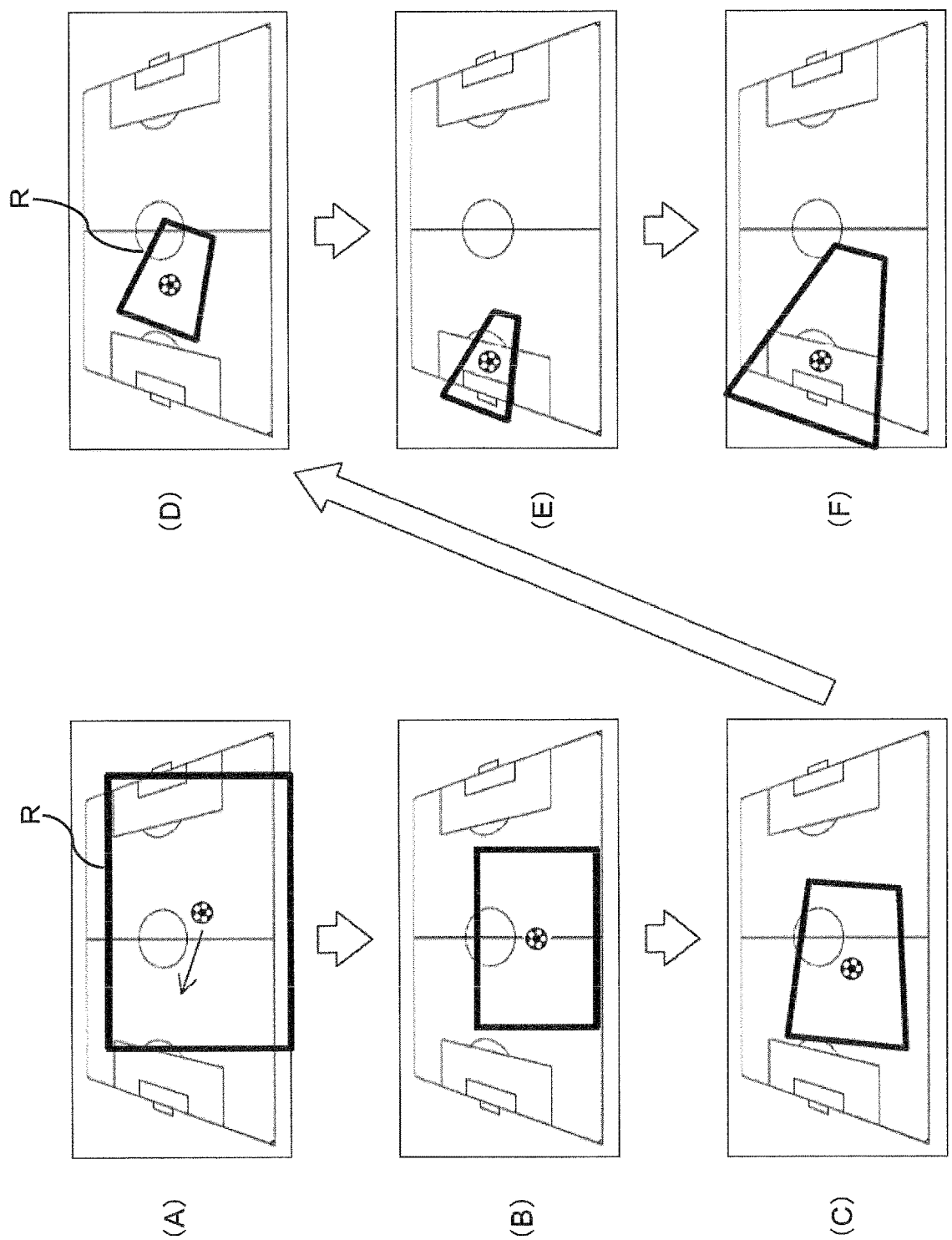
FIG. 16B is a view for explaining a change in shape of the clipping region for a performance effect.

Further, the deformation of the clipping region is effective also when adding a performance effect to the image separately from the correction of the wide-angle distortion. For example, the shape of the clipping region may be deformed in accordance with the movement (moving direction, moving speed, position, and the like) of the object of interest. As a result, various performance effects can be expected. For example, as shown in FIG. 16B, the size and shape of the clipping region may be deformed in accordance with the movement of the soccer ball (an example of the object of interest). This makes it possible to expect various performance effects.

More specifically, the higher the speed of the soccer ball (an example of the object of interest) is, the smaller the size of the clipping region may be, and the lower the speed of the soccer ball is, the larger the size of the clipping region may be. Accordingly, as the moving speed of the soccer ball is higher, the soccer ball and the neighboring subjects are enlarged more largely and displayed. Further, the length of each of the four sides of the rectangular clipping region may be changed in accordance with the clipping region, that is, the position of the object of interest. For example, the length of the side of the clipping region R which is closer to an edge of the screen may be longer than the length of the side closer to the center of the screen. Further, the direction (inclination) of the trapezoidal clipping region may be set such that the height direction of the trapezoidal clipping region coincides with the moving direction of the object of interest.

As shown in (C) to (F) of FIG. 16B, in the case where the side of the clipping region R which is located on the goal side is made long and the side of the clipping region R which is located on the field center side is made short, the subjects in the field central portion are enlarged and the subjects near the goal are reduced and displayed. This further emphasizes the sense of distance near the goal (that is, it appears to be farther away). As shown in (C) to (F) of FIG. 16C, in the case where the side of the clipping region R which is located on the goal side is made short and the side of the clipping region R which is located on the field center side is made long, a performance effect is obtained such that the vicinity of the goal looks farther away. Referring to (C) to (E) of FIG. 16B and (C) to (E) of FIG. 16C, the clipping region R is narrowed as the ball as the object of interest approaches the goal. This implements a zoom-in effect. In addition, the degree of deformation of the clipping region R is increased together with the speed of the ball. When a goal is made and the movement of the ball decreases, a zoom-out effect is implemented by performing clipping so as to include a surrounding region. Note that a clipped image is generated from the image data generated by the image capturing unit 12 or the image data processed by the panorama image correcting unit 14 or the resize processor 16.

Specifically, the object recognition unit 20 detects a predetermined object of interest (a person, a soccer ball, an animal, a vehicle, or the like) and outputs the detection result to the clipping processor 18. Based on the detection result from the object recognition unit 20, the clipping processor 18 may recognize the movement (moving direction, moving speed, and position) of the object of interest and deform the size and shape of the clipping region based on the movement. For example, the clipping processor 18 sets a predetermined region with reference to the position of the detected object as a clipping region.

Figure 17A:
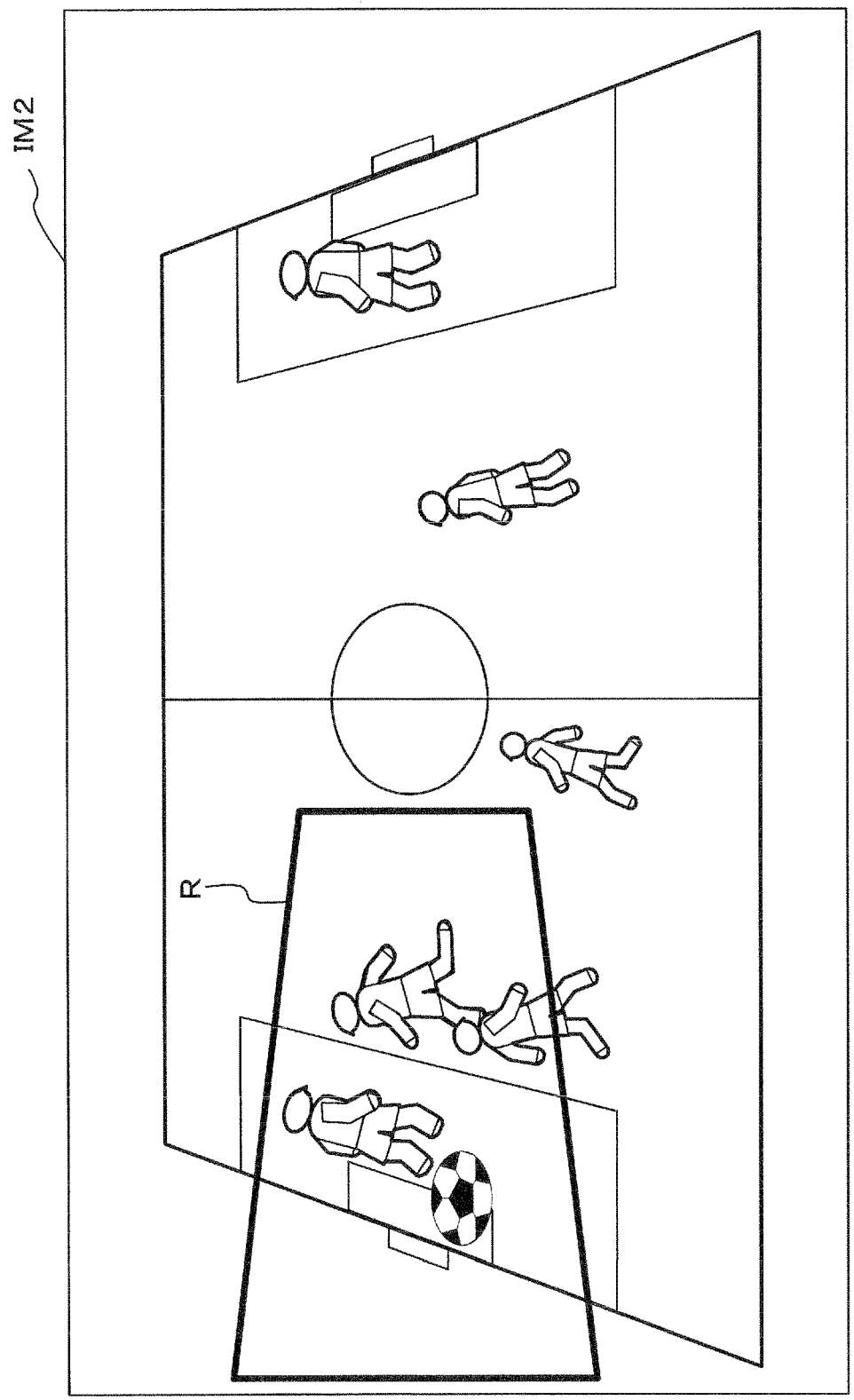
FIG. 17A is a view for explaining an example of a trapezoidal clipping region for wide-angle distortion correction.
Figure 17B:
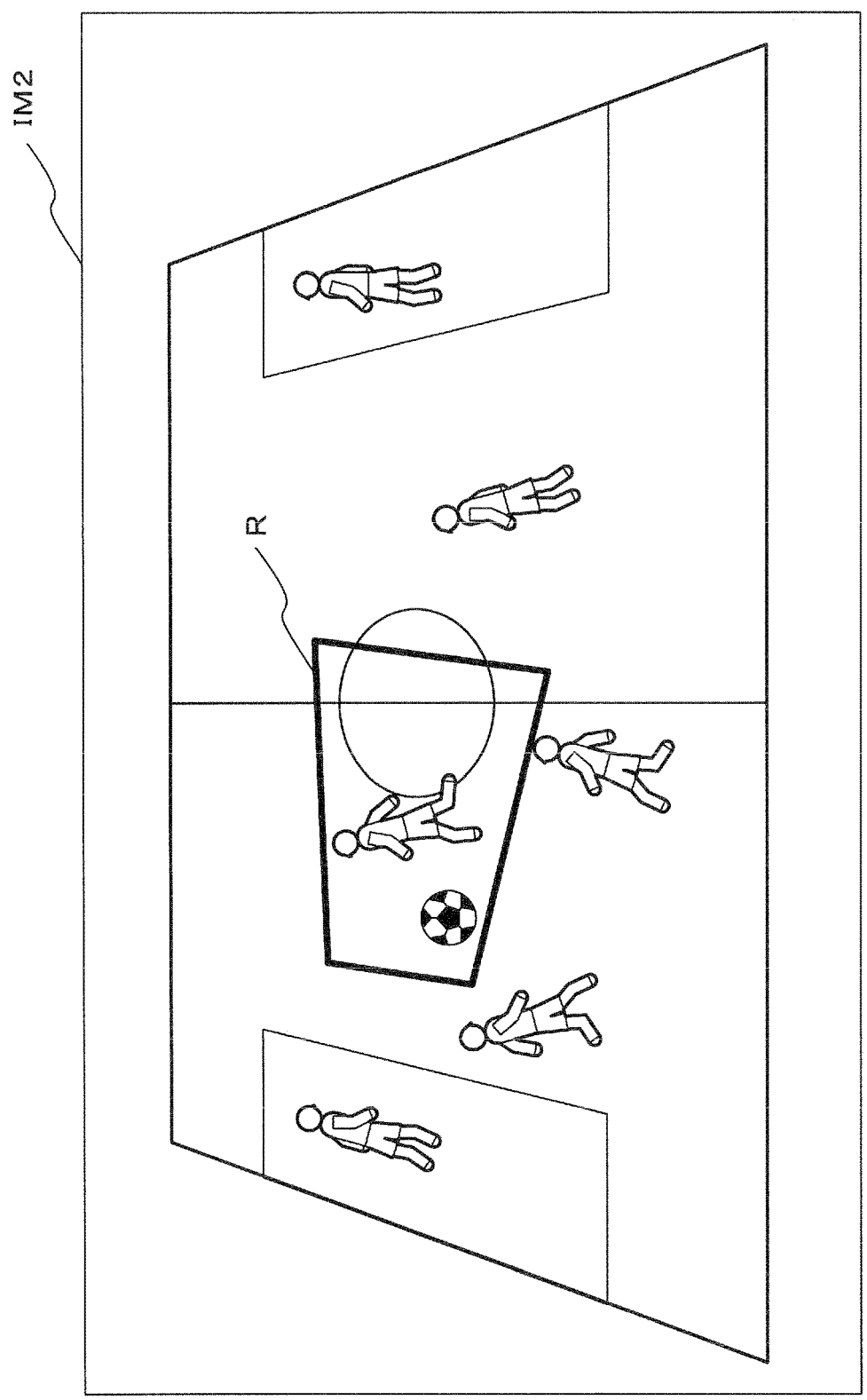
FIG. 17B is a view for explaining another example of the trapezoidal clipping region for a performance effect.
Figure 17C:
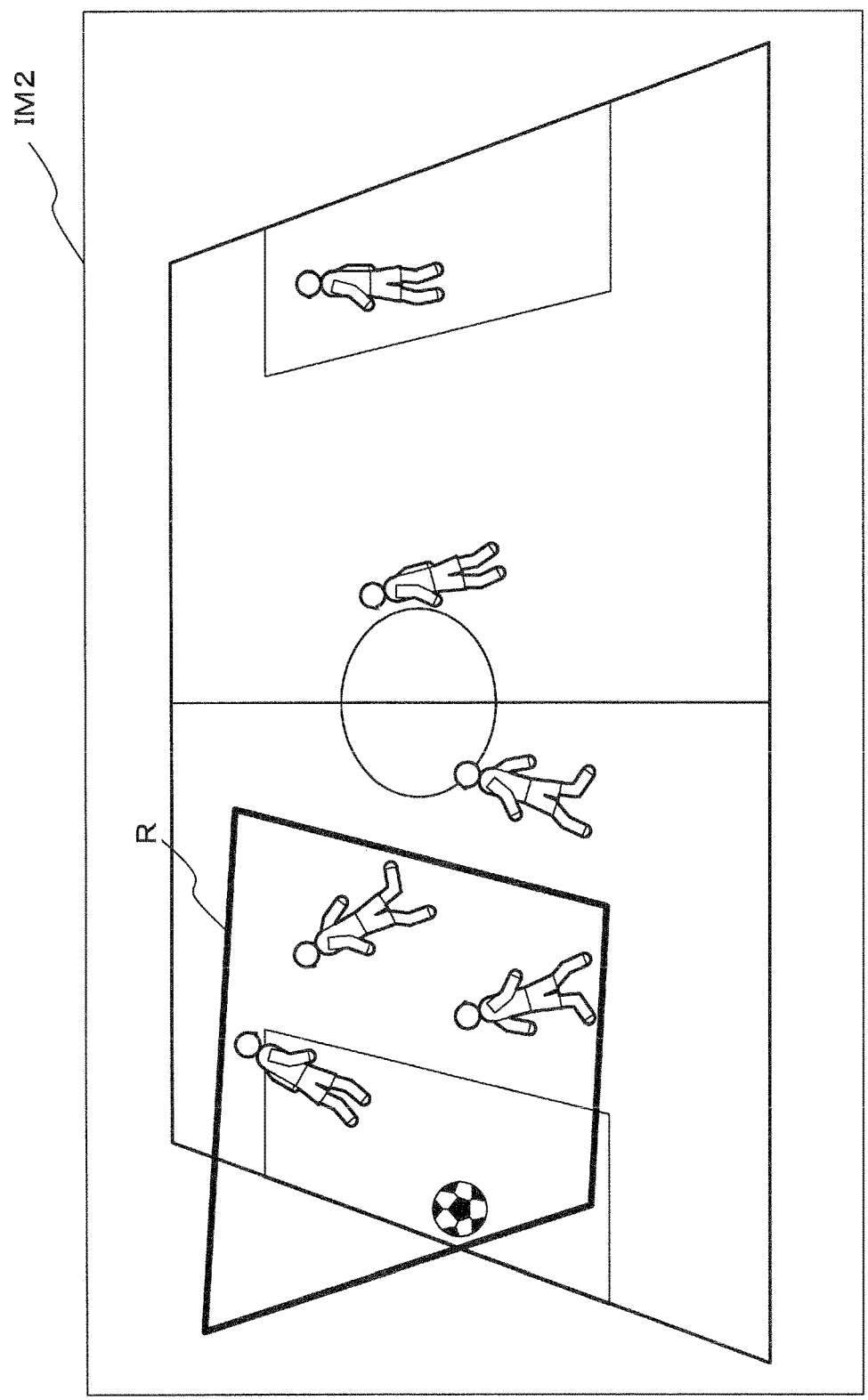
FIG. 17C is a view for explaining an example of the trapezoidal clipping region for a performance effect.
Figure 18A:
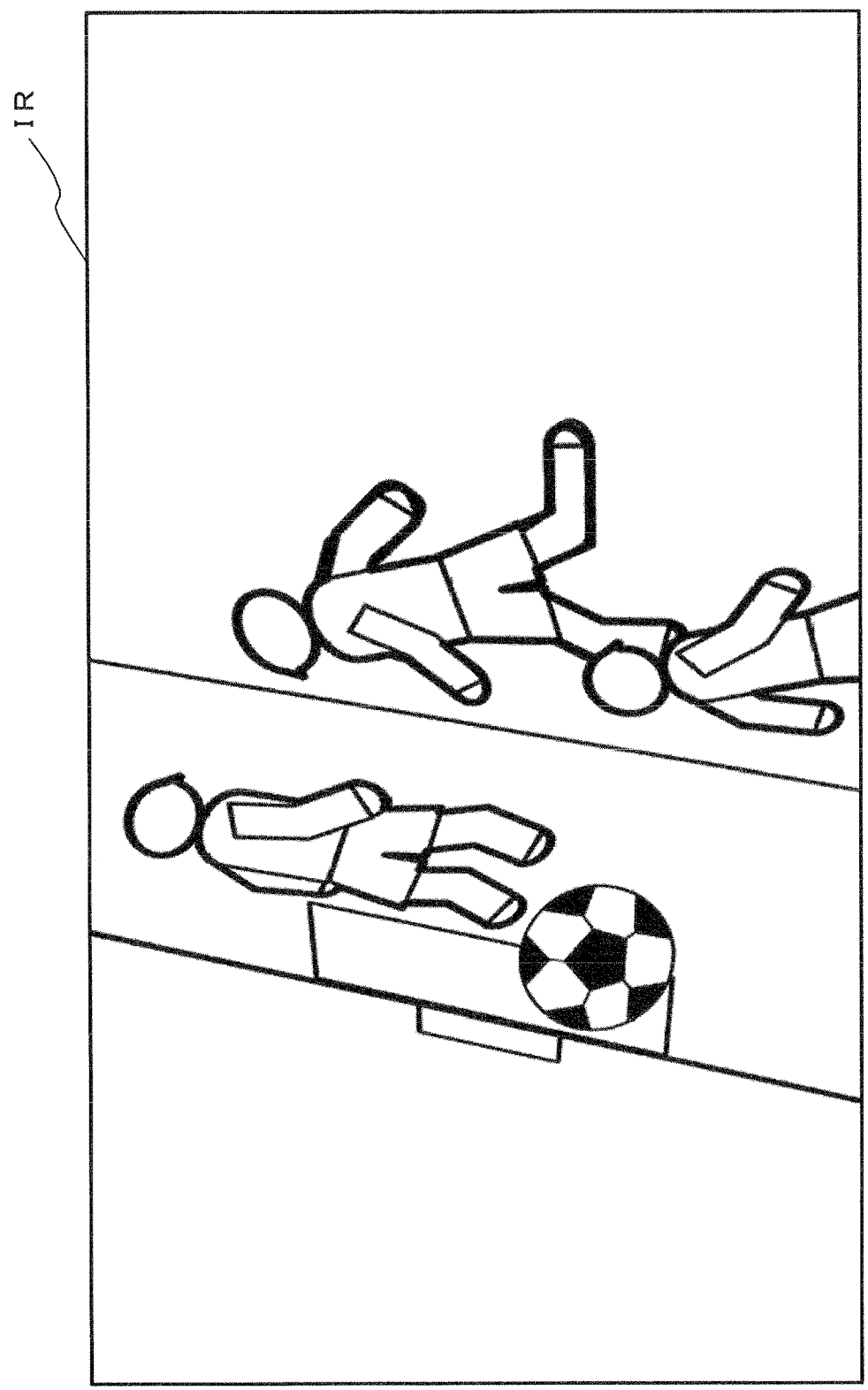
FIG. 18A is a view for explaining a display example using an image clipped in the clipping region shown in FIG. 17A.

FIGS. 17A to 17C are views each showing an example of the clipping region R having a trapezoidal shape. As shown in FIG. 17A, an image of the trapezoidal region R is clipped, projection-converted, and displayed, thereby obtaining a display image whose wide-angle distortion is corrected as shown in FIG. 18A.

Figure 18B:
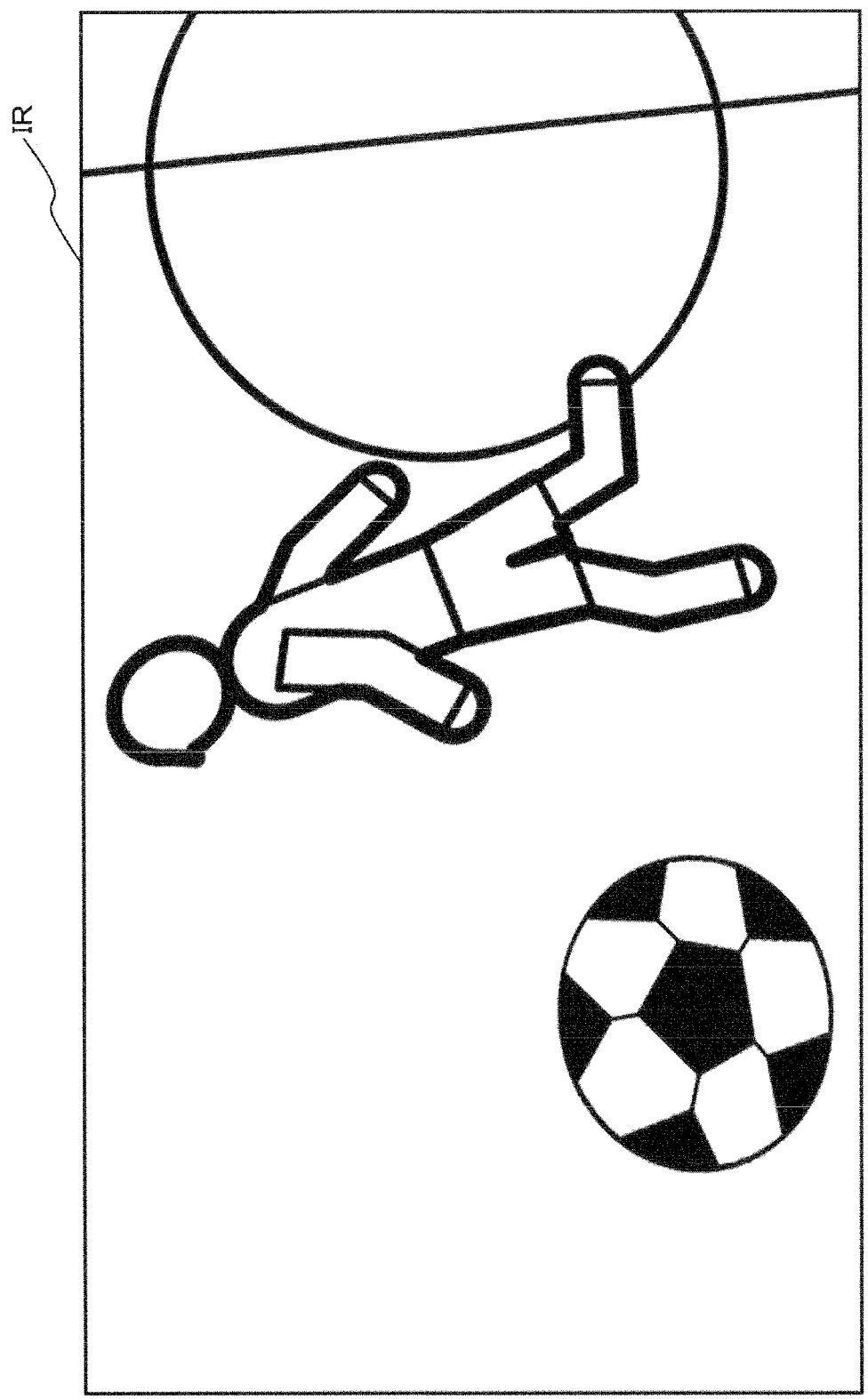
FIG. 18B is a view for explaining a display example using an image clipped in the clipping region shown in FIG. 17B.
Figure 18C:
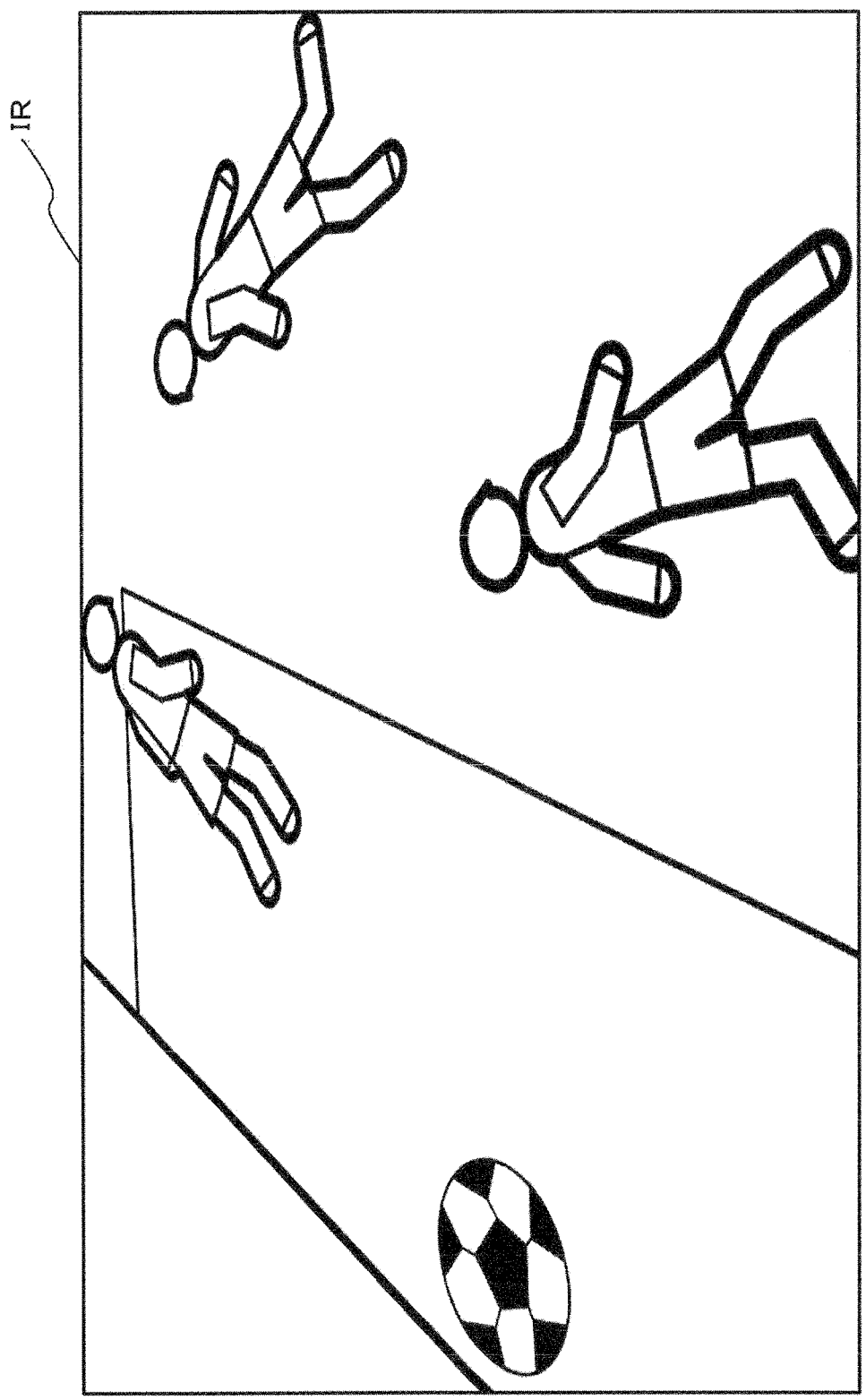
FIG. 18C is a view for explaining a display example using an image clipped in the clipping region shown in FIG. 17C.

As shown in FIG. 17B, an image of the trapezoidal region R is clipped, projection-converted, and displayed, thereby obtaining a display image with the ball being emphasized as shown in FIG. 18B. As shown in FIG. 17C, an image of the trapezoidal region R is clipped, projection-converted (see the following equations), and displayed, thereby obtaining a display image with a lower image portion being emphasized (enlarged) as shown in FIG. 18C. Note that the images shown in FIGS. 18A to 18C are images with output image sizes.

$$x' = (a \cdot x + b \cdot y + c)/(g \cdot x + h \cdot y + 1)$$

$$y' = (d \cdot x + e \cdot y + f)/(g \cdot x + h \cdot y + 1)$$

As described above, by setting the clipping region to a trapezoidal shape in accordance with the degree of the wide-angle distortion of the image, wide-angle distortion can be easily reduced. Also, by deforming the clipping region regardless of the distortion of the image, it is possible to display the deformed image intentionally. This makes it possible to express the image with a sense of realism or a cartoon expression, thereby implementing image display with a performance effect. Note that an object of interest need not necessarily be located in the center of a clipping region. For example, if an object of interest is a ball, it is desirable to clip a region including an athlete following the ball, so that a clipping region may be set such that the object of interest is located along the traveling direction of the clipped image.

[1-3. Effects and Like]

As described above, the video camera (an example of an image capturing apparatus) according to this embodiment includes the optical system 10 including the lens, the image capturing unit 12 configured to generate image data by capturing a subject image input via the optical system 10, and the image processor 50 (an example of an image processing apparatus) configured to process the image data generated by the image capturing unit 12. The image processor 50 includes the image correcting unit 55 that inputs image data and processes the input image data, and the output unit 24 that outputs the image data processed by the image correcting unit 55. The image processor 50 (the panorama image correcting unit 14 and the clipping processor 18) arranges a captured image on the mapping plane Pm (an example of the first plane), maps each pixel included in part or all of the region of the captured image arranged on the mapping plane Pm onto the predetermined spherical surface Ps (an example of a curved surface), and maps each point mapped on the spherical surface Ps onto the mapping planes Pm and Pm1 (an example of the second plane), thereby generating image data.

In this manner, by mapping the pixels of the captured image onto the spherical surface Ps (curved surface) once and then mapping them onto the plane, it becomes possible to correct wide-angle distortion and convert the line of sight, thereby generating a naturally looking image.

For each pixel in a part region or all region of the captured image, the image processor 50 (the panorama image correcting unit 14 and the clipping processor 18) may map the respective points mapped on the spherical surface Ps onto the mapping planes Pm and Pm 1 by orthogonal projection (see FIGS. 5A to 5F and FIGS. 6A to 6F).

This makes it possible to correct wide-angle distortion in an image.

For each pixel in a part region or all region of the captured image, the clipping processor 18 of the image processor 50 may map the respective points mapped on the spherical surface Ps onto a plane by central projection.

The clipping processor 18 may determine the direction of the line of sight SL based on the designation by the user or the position of an object in an image and tilt and/or pan the mapping plane Pm1 with respect to the original mapping plane Pm, on which the captured images are arranged, in accordance with the direction of the line of sight SL (see FIGS. 6A to 6F and FIGS. 7A to 7C). By tilting and/or panning the mapping plane Pm1 in such a manner as described above, wide-angle distortion correction can be performed in accordance with the direction of the line of sight. This makes it possible to generate an image, in a pseudo manner, which the user can see when viewing the region of interest while squarely facing it, thereby generating a natural image.

Further, the clipping processor 18 may generate clipped image data by mapping each pixel included in the clipping region (an example of a partial region) Rn in the captured image onto the predetermined spherical surface Ps, and mapping each of the mapped points on the spherical surface Ps onto the mapping plane Pm1. The clipping processor 18 may continuously generate clipped image data while continuously changing the position and direction of part of the region (see FIGS. 14 and 15).

At this time, the clipping processor 18 may change the position of part of the region such that the locus of the position of the clipping region Rn is arcuate or linear. In this manner, it is possible to obtain a natural image as an image to be captured when panning the video camera.

The clipping processor 18 may calculate the amount of change in the position of the clipping region Rn using a predetermined function. For example, a cumulative distribution function may be used as a predetermined function. By using the cumulative distribution function, it is possible to obtain a change in clipping position in accordance with a more natural motion of the camera.

Other Embodiments

As described above, the embodiment has been described as an example of the technique disclosed in the present application. However, the technology disclosed in the present disclosure is not limited to this, and can also be applied to embodiments in which changes, substitutions, additions, omissions, and the like are made as appropriate. In addition, it is also possible to combine the respective components described in the above embodiment to form a new embodiment.

In the above embodiment, an example of a video camera in which the camera unit 30 and the image processor 50 are mounted integrally has been described. The idea of the present disclosure can be applied to an interchangeable lens camera. In this case, field angle information is sent from the interchangeable lens to the camera body through communication. In that case, the lens information acquiring unit 25 provided in the camera body may acquire the field angle information from the interchangeable lens through communication.

In the above embodiment, mapping is performed from the mapping plane Pm to the spherical surface Ps or from the spherical surface Ps to the mapping plane Pm, but a cylindrical surface (an example of a curved surface) may be used instead of the spherical surface. That is, it is possible to perform mapping from the mapping plane Pm to the side surface of the cylinder or from the side surface of the cylinder to the mapping plane Pm. In this case, for example, it can be considered that a line Ps indicating the spherical surface in FIGS. 5A, 6A, 7A and the like indicates the side surface (section) of the cylindrical surface.

In the above embodiment, a plurality of clipping regions may be set simultaneously in the original image in addition to one clipping region. In addition, various controls on the clipping region can be applied to both moving images and still images.

The processing (wide-angle distortion correction processing and line-of-sight conversion processing) of the image processor 50 (particularly the image correcting unit 55 which is an example of an image corrector) described in the above embodiment can also be applied to image processing in an information processing apparatus such as a personal computer. In this case, the wide-angle distortion correction processing and the line-of-sight conversion processing are executed by the CPU and the MPU of the information processing apparatus (an example of the image processing apparatus).

The above embodiment has exemplified the case in which the wide-angle distortion correction processing and the line-of-sight conversion processing according to the present disclosure are applied to the video camera, but the application range is not limited to the video camera. The wide-angle distortion correction processing and the line-of-sight conversion processing according to the present disclosure can also be applied to other electronic devices (for example, a smartphone, a mobile phone, a network camera, a mobile terminal, and the like) that can capture images.

As described above, the embodiment has been described as an example of the technique disclosed in the present disclosure. To that end, the accompanying drawings and detailed description are provided.

Accordingly, some of the constituent elements described in the accompanying drawings and the detailed description include not only essential constituent elements for solving the problem but also constituent elements which are not essential for solving the problem to illustrate the above technique. For this reason, it should not be recognized that these not essential constituent elements are imperative as soon as these not essential constituent elements are described in the accompanying drawings and detailed description.

Further, because the above embodiment is provided to illustrate the technique in the present disclosure, it is possible to make various changes, substitutions, additions, omissions, and the like within the scope of claims or their equivalents.

INDUSTRIAL APPLICABILITY

According to the present disclosure, it is possible to correct a captured image having wide-angle distortion and generate a naturally looking image. The present disclosure can be applied, in particular, to an image processing apparatus that corrects image data captured by a wide-angle lens.

The first aspect of the present disclosure provides an image processing apparatus. The image processing apparatus includes an image correcting unit that inputs image data and processes the input image data, and an output unit that outputs the image data processed by the image correcting unit. The image correcting unit arranges an input image indicated by the input image data on a first plane, maps each pixel included in part or whole of the region of the input image arranged on the first plane onto a predetermined curved surface, and maps each point mapped on the curved surface onto the second plane, to generate new image data.

The second aspect of the present disclosure provides an image capturing apparatus. The image capturing apparatus includes an optical system including a lens, an image capturing unit that generates image data by capturing a subject image input via the optical system, and the above image processing apparatus that processes a captured image represented by the image data generated by the image capturing unit.

The image processing apparatus according to the present disclosure can generate an image whose distortion has been corrected or an image corresponding to the line of sight of a user, thereby being able to provide an image that looks natural to an observer.

Obviously, numerous modifications and variations of the present invention are possible in light of the above teachings. It is therefore to be understood that within the scope of the appended claims, the invention may be practiced otherwise than as specifically described herein.

What is claimed is:

1. An image processing apparatus comprising:
   an image corrector to
      input image data captured by an imager through an optical system including a lens having an optical center, wherein a field angle of the image data is less than 180 degrees;
      generate a trimmed image data indicated by a specification of a user or based on a gaze direction of the user by the image corrector arranged on a first plane, wherein the first plane corresponds a plane representing an image capturing surface of the imager;
      map each pixel included in the trimmed image data arranged on the first plane onto a curved surface, wherein the curved surface is a spherical surface or a cylindrical surface centered around the optical center;
      map each point mapped on the curved surface onto a second plane, wherein
         the second plane is parallel to the first plane, or
         the second plane is a plane obtained by rotating the first plane about the optical center and is non-parallel to the first plane; and
      map each point mapped on the second plane onto the first plane so as to generate new image data; and
   an output circuit to output the new image data.

2. The image processing apparatus according to claim 1, wherein the image corrector maps each point mapped on the curved surface, which corresponds to each pixel in the part or whole of the region of the input image, onto the second plane by orthogonal projection.

3. The image processing apparatus according to claim 1, wherein the image corrector maps each point mapped on the curved surface, which corresponds to each pixel in the part or whole of the region of the input image, onto the second plane by central projection.

4. The image processing apparatus according to claim 1, wherein the image corrector tilts or pans the second plane with respect to the plane representing the image capturing surface of the imager in accordance with the gaze direction.

5. The image processing apparatus according to claim 1, wherein the image corrector
maps each pixel included in the part of the region of the input image onto the curved surface,
maps each point mapped on the curved surface onto a plane so as to generate the clipped image data, and
continuously generates the clipped image data while continuously changing a position and direction of the part of the region.

6. The image processing apparatus according to claim 5, wherein the image corrector changes the position of the part of the region such that a locus of the position of the part of the region has an arcuate shape or a linear shape.

7. The image processing apparatus according to claim 5, wherein the image corrector calculates a change amount of the position of the part of the region by using a function.

8. The image processing apparatus according to claim 7, wherein the function includes a cumulative distribution function.

9. The image processing apparatus according to claim 1, wherein the image corrector tilts or pans the second plane with respect to the plane representing the image capturing surface of the imager in accordance with a depression angle or an elevation angle of the imager that has captured the image data.

10. The image processing apparatus according to claim 1, wherein an image indicated by the image data includes an image having wide-angle distortion in which a degree of distortion is increased in accordance with a distance from a center of the image.

11. An image capturing, apparatus comprising:
an optical system including a lens having an optical center;
an imager to capture a subject image input through the optical system so as to generate image data, wherein a field angle of the image data is less than 180 degrees; and
an image processing apparatus comprising:
an image corrector to
input the image data;
generate a trimmed image data indicated by a specification of a user or based on a gaze direction of the user by the image corrector arranged on a first plane, wherein the first plane corresponds to a plane representing an image capturing surface of the imager;
map each pixel included in the trimmer image data, arranged on the first plane onto a curved surface, wherein the curved surface is a spherical surface or a cylindrical surface centered around the optical center;
map each point mapped on the curved surface onto a second plane,
wherein the second plane is parallel to the first plane, or
the second plane is a plane obtained by rotating the first plane about the optical center and is non-parallel to the first plane; and
map each point mapped on the second plane onto the first plane so as to generate new image data; and
an output circuit to output the new image data.

* * * * *

UNITED STATES PATENT AND TRADEMARK OFFICE
CERTIFICATE OF CORRECTION

| | |
|---|---|
| PATENT NO. | : 11,463,620 B2 |
| APPLICATION NO. | : 16/158538 |
| DATED | : October 4, 2022 |
| INVENTOR(S) | : Hisako Chiaki |

It is certified that error appears in the above-identified patent and that said Letters Patent is hereby corrected as shown below:

On the Title Page

Related U.S. Application Data
In item (63), change "Continuation of application No. PCT/JP2017/015377, filed on Apr. 4, 2017." to --Continuation of application No. PCT/JP2017/015377, filed on Apr. 14, 2017.--.

Signed and Sealed this
Twenty-first Day of March, 2023

Katherine Kelly Vidal
*Director of the United States Patent and Trademark Office*